US008165392B2

(12) United States Patent
Sekiguchi et al.

(10) Patent No.: US 8,165,392 B2
(45) Date of Patent: Apr. 24, 2012

(54) IMAGE DECODER AND IMAGE DECODING METHOD FOR DECODING COLOR IMAGE SIGNAL, AND IMAGE DECODING METHOD FOR PERFORMING DECODING PROCESSING

(75) Inventors: Shunichi Sekiguchi, Chiyoda-ku (JP);
Yoshimi Moriya, Chiyoda-ku (JP);
Kazuo Sugimoto, Chiyoda-ku (JP);
Yoshihisa Yamada, Chiyoda-ku (JP);
Kohtaro Asai, Chiyoda-ku (JP);
Tokumichi Murakami, Chiyoda-ku (JP); Yuichi Idehara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1005 days.

(21) Appl. No.: 11/980,527

(22) Filed: Oct. 31, 2007

(65) Prior Publication Data
US 2008/0123972 A1 May 29, 2008

Related U.S. Application Data

(62) Division of application No. 11/912,563, filed as application No. PCT/JP2006/312248 on Jun. 19, 2006.

(30) Foreign Application Priority Data

Sep. 20, 2005 (JP) .................................. 2005-272500
Mar. 24, 2006 (JP) .................................. 2006-083524

(51) Int. Cl.
*G06K 9/36* (2006.01)
(52) U.S. Cl. ......... 382/166; 382/232; 382/233; 382/165
(58) Field of Classification Search .................. 382/232, 382/233, 165, 166, 238; 712/8, 32; 375/240.25, 375/240.26, E7.091
See application file for complete search history.

(56) References Cited

U.S. PATENT DOCUMENTS 5,487,172 A * 1/1996 Hyatt .............................. 712/32
(Continued)

FOREIGN PATENT DOCUMENTS
EP          1 906 676 A1      4/2008
(Continued)

OTHER PUBLICATIONS

ITU-T Recommendation H. 264, "Advanced Video Coding for Generic Audiovisual Services", International Telecommunication Untion, pp. I-XIV and 1-325, 2005.

(Continued)

*Primary Examiner* — Anh Hong Do
(74) *Attorney, Agent, or Firm* — Birch, Stewart, Kolasch & Birch, LLP.

(57) ABSTRACT

The present invention makes it possible to include, when encoding processing is applied to three color components using a 4:0:0 format, data for one picture in one access unit and makes it possible to set the same time information or the same set encoding modes among the respective color components. In an image encoding system for applying compression processing to an input image signal including a plurality of color components, encoded data obtained by independently subjecting an input image signal of each of the color components to encoding processing and a parameter indicating which color component the encoded data corresponds to are multiplexed with a bit stream. In an image decoding system for inputting a bit stream in which an image signal including a plurality of color components is compressed to perform decoding processing, decoding processing of the encoded data of each of the color components is performed using a parameter indicating which color component the encoded data corresponds to.

4 Claims, 25 Drawing Sheets

U.S. PATENT DOCUMENTS

| | | | |
|---|---|---|---|
| 5,818,970 A | 10/1998 | Ishikawa et al. | |
| 5,914,753 A | 6/1999 | Donovan | |
| 6,891,893 B2* | 5/2005 | Sullivan et al. | 375/240.25 |
| 7,492,950 B2* | 2/2009 | Suzuki et al. | 382/232 |
| 2002/0005909 A1 | 1/2002 | Sato | 375/240.01 |
| 2005/0219574 A1 | 10/2005 | Ok et al. | |
| 2005/0271288 A1 | 12/2005 | Suzuki et al. | 382/232 |

FOREIGN PATENT DOCUMENTS

| | | |
|---|---|---|
| JP | 9-186883 A | 7/1997 |
| JP | 10-013859 A | 1/1998 |
| JP | 10-164584 A | 6/1998 |
| JP | 2000-23190 A | 1/2000 |
| JP | 2001-359117 | 12/2001 |
| JP | 2002-84540 | 3/2002 |
| JP | 2003-23545 A | 1/2003 |
| JP | 2005-39743 | 2/2005 |
| JP | 2005-101731 A | 4/2005 |
| JP | 2005-124182 A | 5/2005 |
| JP | 2005-160086 A | 6/2005 |
| JP | 2005-349755 | 12/2005 |
| KR | 10-0552695 | 5/2005 |
| KR | 2005-0049007 | 5/2005 |

OTHER PUBLICATIONS

U.S. Appl. No. 11/980,518, filed Oct. 31, 2007, Sekiguchi, et al.
U.S. Appl. No. 11/980,512, filed Oct. 31, 2007, Sekiguchi, et al.
U.S. Appl. No. 11/980,533, filed Oct. 31, 2007, Sekiguchi, et al.
U.S. Appl. No. 11/980,422, filed Oct. 31, 2007, Sekiguchi, et al.
U.S. Appl. No. 11/980,521, filed Oct. 31, 2007, Sekiguchi, et al.
U.S. Appl. No. 11/980,402, filed Oct. 31, 2007, Sekiguchi, et al.
Wedi, et al.; Intra-Only 4:4:4 Coding for H.264/AVC FRExt; Proposal Document to JVT; Jul. 24-29, 2005; pp. 1-11; 16th Meeting; Poznan, PL.
Yu, et al.; Advanced 4:4:4 Profile for MPEG4-Part10/H.264; Proposal to JVT; Jul. 24-29, 2005; pp. 1-22; 16th Meeting; Poznan, PL.
Woo-Shik, et al.; Enhancements to RGB Coding in H.264/MPEG-4 AVC FRExt; Proposal; Apr. 16-22, 2005; pp. 1-10; 26th Meeting; Busan, KR.
Gary Sullivan, et al. "Draft Text of H.264/AVC Amendment 2"; Joint Video Team (JVT) of ISO/IEC MPEG & ITU-T VCEG (ISO/IEC JTC1/SC29/WG11 and ITU-T SG16 Q.6) 18th Meeting: Bangkok, Thailand, Jan. 14-20, 2006; pp. 1-43.
Sekiguchi, et al. "Results of CE on separate prediction modes for 4:4:4 coding (CE9)"; Joint Video Team (JVT) of ISO/IEC MPEG & ITU-T VCEG (ISO/IEC JTC1/SC29/WG11 and ITU-T SG16 Q.6) 18th Meeting: Bangkok, Thailand, Jan. 14-20, 2006; XP 030006299; pp. 1-28.
Richardson, Iain E. G., "H.264 and MPEG-4 Video Compression: Video Coding for Next-Generation Multimedia"; ISBN: 9780470848371; Wiley 2003; pp. 21-28.
K.K. Impress; H.264/AVC Text; Aug. 11, 2004; pp. 100-101.

* cited by examiner

FIG. 2

| VALUE | MEANING |
|---|---|
| 0 | ENCODE THREE COLOR COMPONENTS AS GROUP |
| 1 | COLOR COMPONENT 1 |
| 2 | COLOR COMPONENT 2 |
| 3 | COLOR COMPONENT 3 |

IMAGE DECODER AND IMAGE DECODING METHOD FOR DECODING COLOR IMAGE SIGNAL, AND IMAGE DECODING METHOD FOR PERFORMING DECODING PROCESSING

CROSS REFERENCE TO RELATED APPLICATIONS AND INCORPORATION BY REFERENCE

This application is a divisional of and claims the benefit of priority under 35 USC §120 from U.S. Ser. No. 11/912,563, filed Oct. 25, 2007, which is based upon and claims the benefit of priority under 35 USC §371 from PCT/JP06/312248, filed Jun. 19, 2006, and is based upon and claims the benefit of priority under 35 USC §119 from the Japanese Patent Applications No. 2005-272500, filed Sep. 20, 2005 and No. 2006-083524, filed Mar. 24, 2006, the entire contents of both of which are incorporated herein by reference.

TECHNICAL FIELD

The present invention relates to an image encoding method and an image encoder for applying compression processing to input image signals composed of a plurality of color components, an image decoding method and an image decoder for inputting a bit stream in which image signals composed of a plurality of color components are compressed and performing decoding processing, and an image encoded bit stream and a recording medium.

BACKGROUND ART

Conventionally, international standard video encoding systems such as MPEG and ITU-TH.26x are adopted mainly on condition that an input signal format called a "4:2:0" format is used. The 4:2:0 format represents a format for converting a color image signal such as RGB into a luminance component (Y) and two chrominance components (CB and CR) and reducing the number of samples of the chrominance components to a half both in horizontal and vertical directions with respect to the number of samples of the luminance component. Since visibility for the chrominance components is low compared with that for the luminance component because of vision characteristics of the human being, the conventional international standard video encoding system is adopted on condition that an amount of information on an object of encoding is reduced by reducing the number of samples of the chrominance components before encoding is performed.

On the other hand, according to the increase in resolution and the increase in gradation of a video display in recent years, a system for encoding an image with samples identical with the luminance components without down-sampling the chrominance components is examined. A format in which the number of samples of the luminance components and the number of samples of the chrominance components are identical is called a "4:4:4" format. For an encoding system for inputting the 4:4:4: format, a "high 444 profile" is decided (see, for example, Non-patent Document 1).

While the conventional 4:2:0 format is adopted on condition that the chrominance components are down-sampled and is limited to color spaces of Y, CB, and CR, there is no distinction of a sample ratio among color components in the 4:4:4 format, so it is possible to directly use R, G, and B other than Y, CB, and CR and define and use other color spaces.

Non-patent Document 1: ISO/IEC 14496-10|ITU-TH.264 standard (Advanced Video Coding: AVC)

DISCLOSURE OF THE INVENTION

Problems to be Solved by the Invention

When the high 444 profile defined in the ISO/IEC 14496-10|ITU-TH.264 (2005) standard (hereinafter abbreviated as AVC) is used, as in the conventional encoding system, it is necessary to perform encoding processing and decoding processing with a macro-block as a unit.

In other words, since data of three color components are included in one macro-block, the data of the respective color components are processed in order in macro-block units. This is not preferable for the purpose of performing encoding and decoding processing in parallel.

On the other hand, in the AVC, a 4:0:0 format is defined. This format originally targets encoding processing of an image of only the luminance components, that is, a monochrome image. It is also possible to adopt a method of generating three independent encoded data by applying encoding processing to the respective three color components of the 4:4:4 format using the 4:0:0 format. In this case, since the respective color components are independently processed, parallel processing is possible.

However, since the respective color components are independently processed, it is impossible to realize, in the present standard, processing of setting the same time information and using a uniform encoding mode among the respective color components. Therefore, there is a problem in that it is impossible to easily realize random access reproduction (fast forward, rewind, etc.) and editing processing in picture units.

This problem will be further explained. Various data defined in the AVC are arranged in an order of an access unit delimiter (AUD), a sequence parameter set (SPS), a picture parameter set (PPS), and picture data. Data not related to the present invention are not explained here.

In the AVC, it is defined that one access unit (AU) is constituted by one picture (equivalent to one frame or one field). It is possible to indicate a boundary of access units using an access unit delimiter (AUD). For example, in a Baseline profile of the AVC, since access unit delimiters are arranged in boundaries of respective pictures, it is possible to independently and easily extract one access unit by detecting the access unit delimiters. This makes it possible to decode data for one picture.

On the other hand, when three color components are encoded by the 4:0:0 format using the present AVC system, an access unit is defined for each of the color components. Accordingly, one picture is constituted by three access units. Therefore, it is impossible to extract data for one picture simply by detecting the access unit delimiters. It is impossible to easily realize random access reproduction and editing processing in picture units. Since encoding processing is independently performed for each of the color components, it is difficult to set the same time information and use a uniform encoding mode.

Thus, it is an object of the present invention to provide an image encoding method and an image decoding method, an image encoder and an image decoder, and an image encoded bit stream and a recording medium that make it possible to include data for one picture in one access unit by extending the AVC even when encoding processing is applied to the respective three color components of the 4:4:4 format using the 4:0:0 format and make it possible to set the same time information and use a uniform encoding mode among the respective color components.

Means for Solving the Problems

According to the present invention, in an image encoding method for applying compression processing to an input image signal including a plurality of color components, encoded data obtained by independently subjecting an input image signal of each of the color components to encoding processing and a parameter indicating which color component the encoded data corresponds to are multiplexed with a bit stream.

Further, according to the present invention, in an image decoding method for performing decoding processing based on an input of a bit stream generated by compressing an image signal including a plurality of color components, decoding processing for encoded data of each of the color components is performed by using a parameter indicating which color component encoded data corresponds to.

Further, according to the present invention, an image encoder for applying compression processing to an input image signal including a plurality of color components includes multiplexing means for multiplexing encoded data obtained by independently subjecting an input image signal of each of the color components to encoding processing and a parameter indicating which color component the encoded data corresponds to, with a bit stream.

Further, according to the present invention, an image decoder for performing decoding processing based on an input of a bit stream generated by compressing an image signal including a plurality of color components includes detecting means for detecting a parameter indicating which color component encoded data corresponds to.

Further, according to the present invention, in a bit stream generated as a result of compression-encoding of an input image signal including a plurality of color components, compressed data of an image signal of each of the color components is constituted in slice units, and a parameter indicating which color component compressed data included in the slice data corresponds to includes is multiplexed with a header region of the slice.

Further, the present invention provides a recording medium recorded with a bit stream which is generated as a result of compression-encoding of an input image signal including a plurality of color components, and in which compressed data of an image signal of each of the color components is constituted in slice units, and a parameter indicating which color component compressed data included in the slice data corresponds to is multiplexed with a header region of the slice.

EFFECTS OF THE INVENTION

According to the present invention, it is possible to easily execute random access reproduction and editing processing in picture units using an AUD. It is possible to include data for one picture in one access unit even when encoding processing is applied to three color components using the 4:0:0 format. In addition, it is possible to set the same time information and use a uniform encoding mode among the respective color components.

BRIEF DESCRIPTION OF THE DRAWINGS

FIG. 2 is a diagram for explaining a definition of parameter colour_id as another method of securing compatibility with an existing standard.

BEST MODE FOR CARRYING OUT THE INVENTION

First Embodiment

Figure 1:
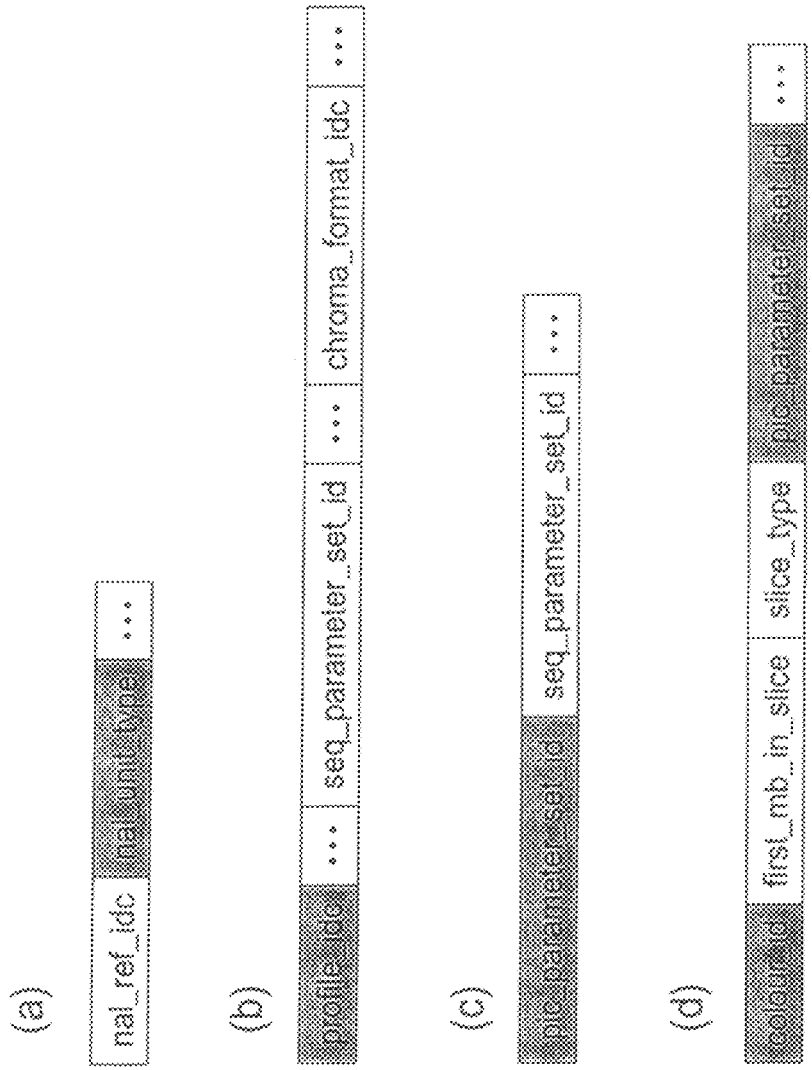
FIG. 1 is a diagram of portions related to the present invention extracted from syntaxes of an encoded bit stream generated by an image encoder according to the present invention.

FIG. 1 is a diagram of portions related to the present invention extracted from syntaxes of an encoded bit stream generated by an image encoder according to the present invention. In FIG. 1, part (a) indicates a syntax of header information of an NAL (network abstraction layer) unit, part (b) indicates a syntax of an SPS (sequence parameter set), part (c) indicates a syntax of a PPS (picture parameter set), and part (d) indicates a syntax of a slice header. Portions other than shaded portions are syntaxes that are defined in the existing AVC standard. The shaded portions are syntaxes that are defined in the existing AVC standard but to which new functions are added according to the present invention or syntaxes that are not defined in the existing AVC standard and added anew according to the present invention.

Parameters defined in the AVC will be hereinafter briefly described.

In part (a) of FIG. 1, nal_ref_idc of the NAL unit is a parameter indicating whether data of the NAL unit is image data used for prediction and reference. Further, nal_unit_type is a parameter indicating whether the data of the NAL unit is slice data, the SPS, the PPS, or an access unit delimiter (AUD).

In part (b) of FIG. 1, profile_idc of the SPS indicates a profile of an encoding sequence. Base line, main, high, high 444, and the like are defined as profiles in the AVC. Seq_parameter_set_id indicates an ID of the SPS. A plurality of SPSs are defined in one encoding sequence and managed with IDs. Moreover, chroma_format_idc is used only at the time of the high 444 profile and is a parameter indicating which format of 4:0:0, 4:2:0, 4:2:2, and 4:4:4 the encoding sequence is.

In part (c) of FIG. 1, pic_parameter_set_id of the PPS indicates an ID of the PPS. A plurality of PPSs are defined in one encoding sequence and managed with IDs. Seq_parameter_set_id in the PPS is a parameter indicating to which SPS this PPS belongs.

In part (d) of FIG. 1, first_mb_in_slice of the slice header is a parameter indicating in which position in a screen leading block data of slice data is located. Further, slice_type is a parameter indicating which of intra-frame encoding, predictive encoding, and bi-predictive encoding the slice data is. Moreover, pic_parameter_set_id is a parameter indicating to which PPS the slice data belongs.

Operations will be explained next.

When encoding processing is applied to an image signal of three color components independently for each of the color components using the 4:0:0 format, data indicating processing of independently encoding the three color components using the 4:0:0 format is provided anew in profile_idc, which is one of the parameters included in the SPS shown in part (b) of FIG. 1. A parameter of colour_id is provided anew in the slice header shown in part (d) of FIG. 1 to indicate which of the three color components encoded data included in the slice data is.

When the encoding processing is performed in the existing 4:0:0 format (a monochrome image), 4:2:0 format, 4:2:2 format, and 4:4:4 format, the parameter colour_id shown in part (d) of FIG. 1 is not used. Only in the mode of independently encoding the data of the three color components using the 4:0:0 format defined anew according to the present invention, the parameter colour_id is used to thereby make it possible to prevent the existing standard from being affected.

Figure 3:
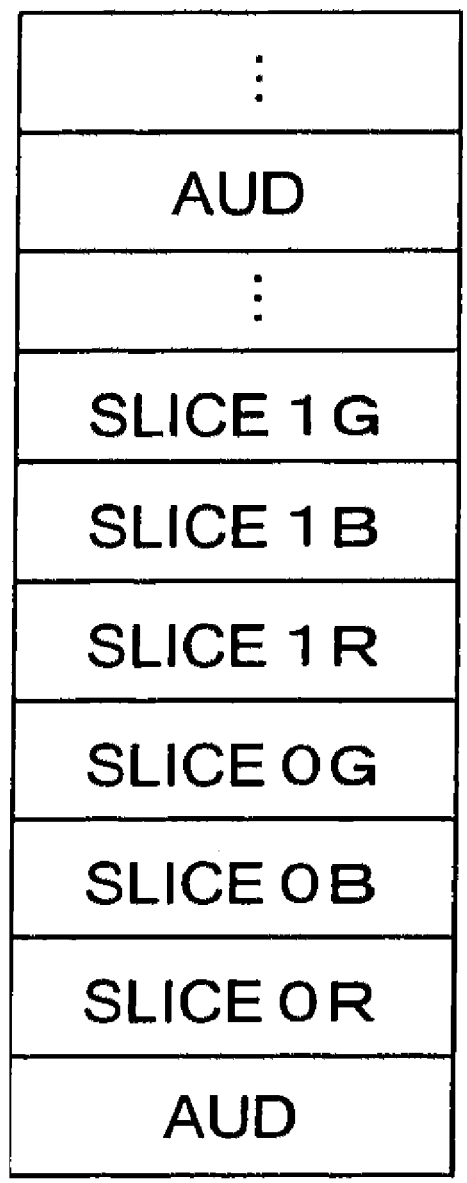
FIG. 3 is an explanatory diagram in which data of all color components constituting one picture between an AUD and an AUD are included in one access unit (AU).

In the mode of independently encoding the data of the three color components using the 4:0:0 format defined anew by the present invention, the parameter colour_id is used to, as shown in FIG. 3, include the data of the three color components in one access unit (AU) and place data of all color components constituting one picture between an AUD and a next AUD.

As another method of securing compatibility with the existing standard, the parameter colour_id may be defined as shown in FIG. 2. When colour_id is defined in this way, in the case of colour_id=0, this indicates slice data that is encoded in a format in which the data of the three color components are included in one macro-block as in the existing standard. In the case of other values, it is possible to indicate slice data encoded by the processing of independently encoding the data of the three color components using the 4:0:0 format described in the first embodiment.

This makes it possible to constitute a bit stream covering both the existing system and the system described in the first embodiment, which is useful in keeping compatibility with the existing system. When the number of slices increases and an overhead of an amount of encoding of the parameter colour_id itself affects encoding efficiency, the amount of the parameter colour_id itself may be reduced by performing appropriate variable length encoding on the basis of a judgment criterion defining which of the existing system and the system described in the first embodiment is more easily selected.

In this way, in the image encoding system for applying the compression processing to input image signals composed of a plurality of color components, encoded data obtained by independently applying the encoding processing to the input image signals of the respective color components and a parameter indicating from which color component the encoded data is obtained are multiplexed with a bit stream. This makes it possible to easily execute random access reproduction and editing processing in picture units using the AUD.

In the image decoding system for inputting a bit stream in which an image signal composed of a plurality of color components is compressed and performing the decoding processing, it is possible to easily perform the decoding processing for the encoded data of the respective color components using a parameter indicating from which color component encoded data is obtained.

Since the data of the three color components are included in one access unit, the data of the three color components are simultaneously encoded as an IDR (Instantaneous Devoding Refresh) picture.

The IDR picture is defined in the AVC. Normal decoding processing can be instantly performed from the IDR picture. The IDR picture is provided on the assumption that the IDR picture is used as the top of random access reproduction.

When it is desired to extract only one color component of the three color components, this can be easily realized by extracting only a slice data of colour_id having a specific value.

In FIG. 1, the colour_id parameter is provided at the top of the slice header. However, it is not always necessary to arrange the colour_id at the top of the slice header. It is possible to obtain the same effects if the colour_id parameter is included in the slice header.

Second Embodiment

Figure 4:
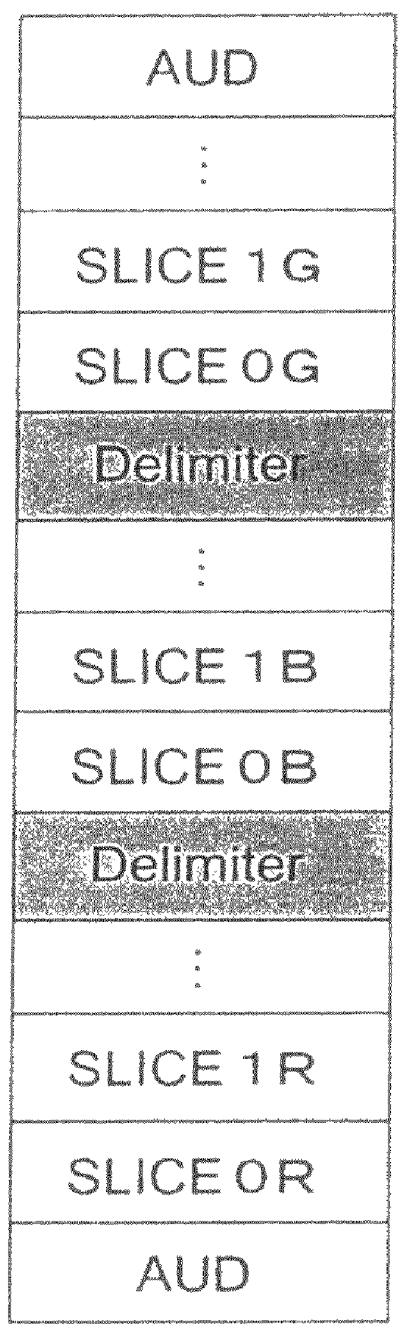
FIG. 4 is an explanatory diagram in which data of four color components are delimited for each color component by a delimiter and arranged together in one access unit.

As in the first embodiment, encoded data of three color components are included in one access unit. However, whereas data (R, B, G) of the respective color components are arranged in order in the first embodiment shown in FIG. 3, it is also possible to adopt a method of arranging the same color components of R, B, or G together, respectively as shown in FIG. 4. Moreover, it is also possible to easily extract only data of a predetermined color component by inserting "Delimiter" which is not defined in the present AVC standard.

Consequently, for example, it is possible to easily allocate different processors for the respective color components to perform processing in parallel. It is possible to realize the "Delimiter" described in the present invention without affecting the existing standard by extending an SEI (Supplemental Enhancement Information) message payload of the AVC. It goes without saying that it is possible to obtain the same effects when the "Delimiter" is defined according to other methods.

Third Embodiment

It is also possible to obtain the same effects as the first embodiment by inserting a parameter indicating a color component in a part of the NAL unit instead of colour_id of the slice header. In the AVC, since a slice header and slice data following the slice header are defined as a payload of the NAL unit, the nal_unit_type parameter of the NAL unit is extended to indicate in this parameter which color component the video data included in the payload of the NAL unit is. Moreover, by including the data of the three color components in one access unit (AU), all data constituting one picture are placed between an AUD and a next AUD.

Consequently, as in the first embodiment, it is possible to easily execute random access reproduction and editing processing in picture units. In addition, when it is desired to extract only one component among the three color components, it is possible to extract the component according to only header data of the NAL unit without analyzing the slice header.

Fourth Embodiment

In the first to the third embodiments, a limitation is provided such that the same value is always set for the first_mb_in_slice parameter of the encoded slice header in which the data of the three color components are encoded. The first_mb_in_slice parameter indicates a position of the first data of the slice data in a screen.

In the encoding system of the conventional AVC, since it is possible to take an arbitrary format for a structure of a slice, different structures of the slices among the respective color components can be adopted. However, by providing this limitation, it is possible to decode and display a part of an image having a correct state of colors by collecting three slice data having the same value of first_mb_in_slice.

Consequently, when it is desired to display a specific portion of a screen, for example, only the center, it is possible to perform decoding and display processing using only slice data of a part of the screen rather than the full screen, whereas, when the limitation is not provided, it is impossible to combine the three color components to obtain a correct decoded image unless the entire screen is decoded using slice data of the full screen because values of first_mb_in_slice are different among the respective color components. When parallel processing is performed using respective processors for the data of the respective color components, respective slice data items are started from the same position, so it is easy to manage the parallel processing.

Fifth Embodiment

A limitation is further provided such that the same value is always set for the slice_type parameter of the slice header of the respective color components in addition to the limitation in the fourth embodiment. The slice_type parameter indicates, for example, which of intra-frame encoding, predictive encoding, and bi-predictive encoding the slice data following the slice header is. If the slice data is the intra-frame encoding, since intra-frame prediction processing is not used, it is possible to instantly perform decoding and display processing.

Thus, for slice data in the same position on a screen, a type of encoding is made common to all the color components and the same encoding processing is performed. This allows a decoder to perform decoding and display processing at high speed by subjecting only a slice of the intra-frame encoding to decoding processing at the time of random access reproduction.

Sixth Embodiment

By adopting the structures described in the first to the fifth embodiments, it is possible to switch, in an arbitrary unit, a mode of independently encoding data of three color components using the 4:0:0 format defined anew and an encoding mode of the 4:4:4 format.

Figure 5:
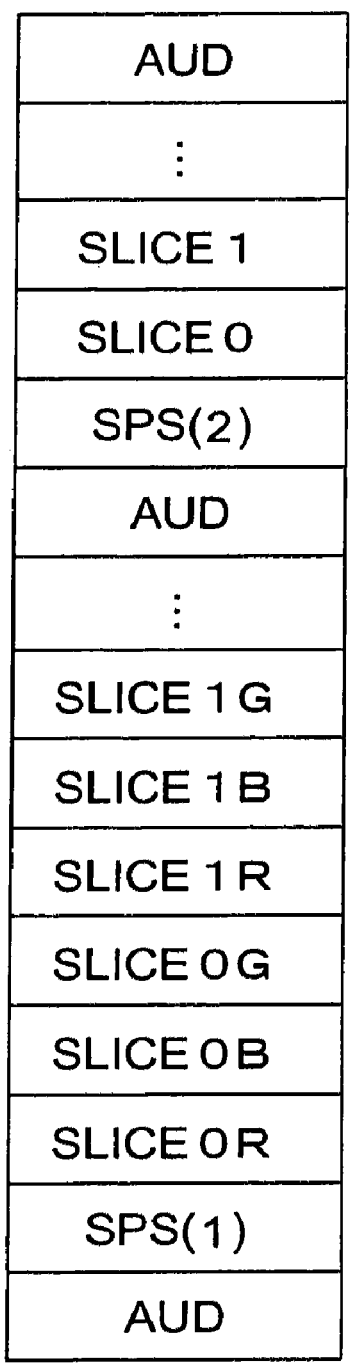
FIG. 5 is an explanatory diagram in which encoding modes of a 4:0:0 format and a 4:4:4 format are switched in an arbitrary unit.

For example, as shown in FIG. 5, the 4:0:0 format defined anew is set for seq_parameter_set_id=1 of an SPS. A parameter of the 4:4:4 format is set for seq_parameter_set_id=2. SPSs corresponding to the seq_parameter_set_id are set with different pic_paramater_set_id given thereto. This makes it possible to switch both the 4:0:0 format and the 4:4:4 format in picture units.

Consequently, it is possible to select one of the formats with high encoding efficiency to perform encoding processing and select convenient one of the formats depending on an application to perform encoding processing.

In the fifth embodiment, it is explained that both the formats are switched in picture units. However, under the standard of the AVC, it is also possible to switch the formats in slice units according to the same processing.

The present invention is explained using the AVC, which is the international standard of the moving image encoding system. However, it goes without saying that it is possible to obtain the same effects using other encoding systems.

Seventh Embodiment

In a seventh embodiment of the present invention, an apparatus structure and an operation for performing encoding and decoding while changing encoding of three color component signals by a common macro-block header and encoding of the three color component signals by separate macro-block headers in a unit of one frame (or one field) will be explained on the basis of specific drawings. In the following explanation, unless specifically noted otherwise, the description "one frame" is regarded as a data unit of one frame or one field.

It is assumed that a macro-block header according to the seventh embodiment includes: encoding and prediction mode information such as a macro-block type, a sub-macro-block type, and an intra-prediction mode; motion prediction information such as a reference image identification number and a motion vector; and macro-block overhead information other than transform coefficient data such as a quantization parameter for a transform coefficient, a transform block size indication flag, and an effective transform coefficient presence/absence judgment flag in 8×8 block units.

In the following explanation, processing of encoding three color component signals of one frame with the common macro-block header is referred to as "common encoding processing" and processing of encoding three color component signals of one frame with separate independent macro-block headers is referred to as "independent encoding processing". Similarly, processing of decoding frame image data from a bit stream in which three color component signals of one frame is encoded by the common macro-block header is referred to as "common decoding processing" and processing of decoding frame image data from a bit stream in which three color component signals of one frame are encoded by separate independent macro-block headers is referred to as "independent decoding processing".

Figure 6:
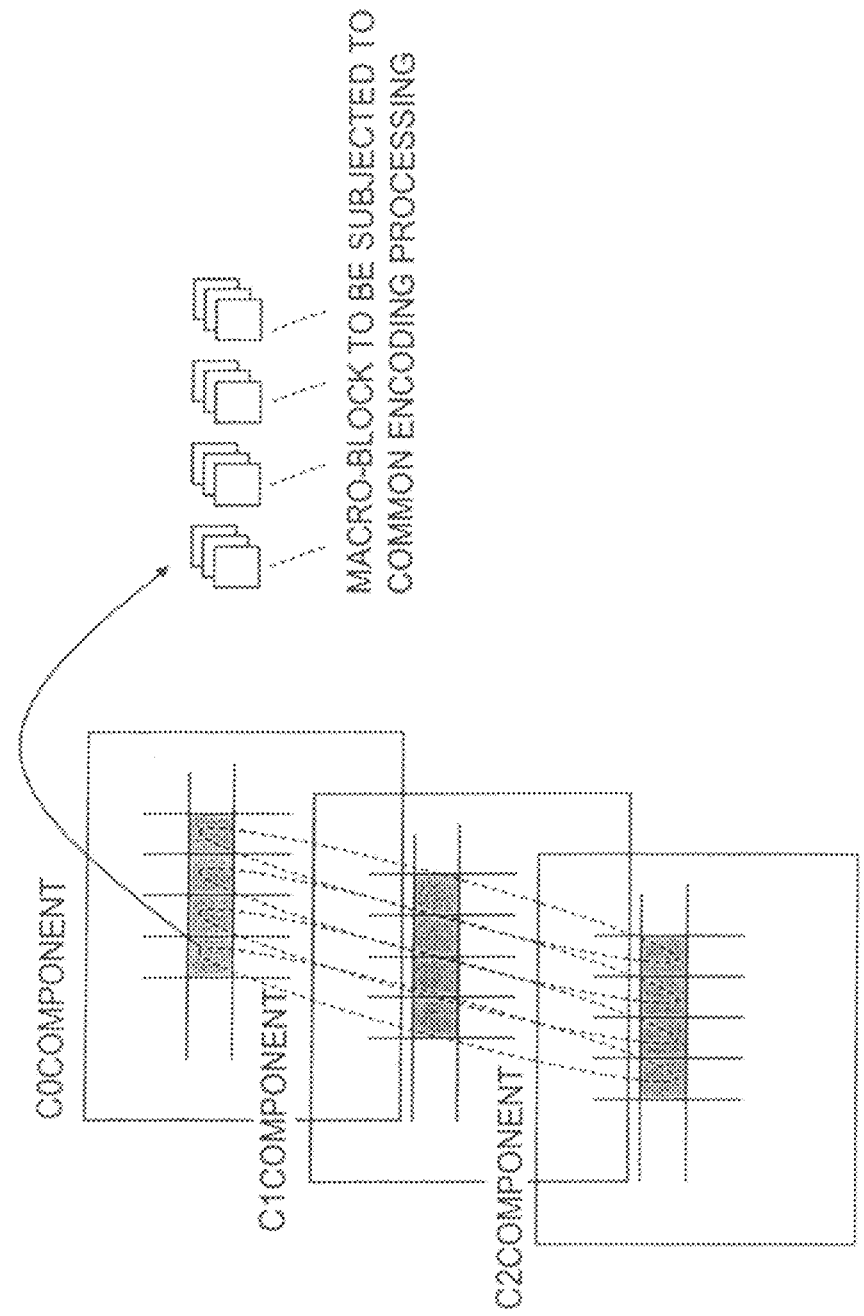
FIG. 6 is a diagram for explaining common encoding processing according to a seventh embodiment of the present invention.
Figure 7:
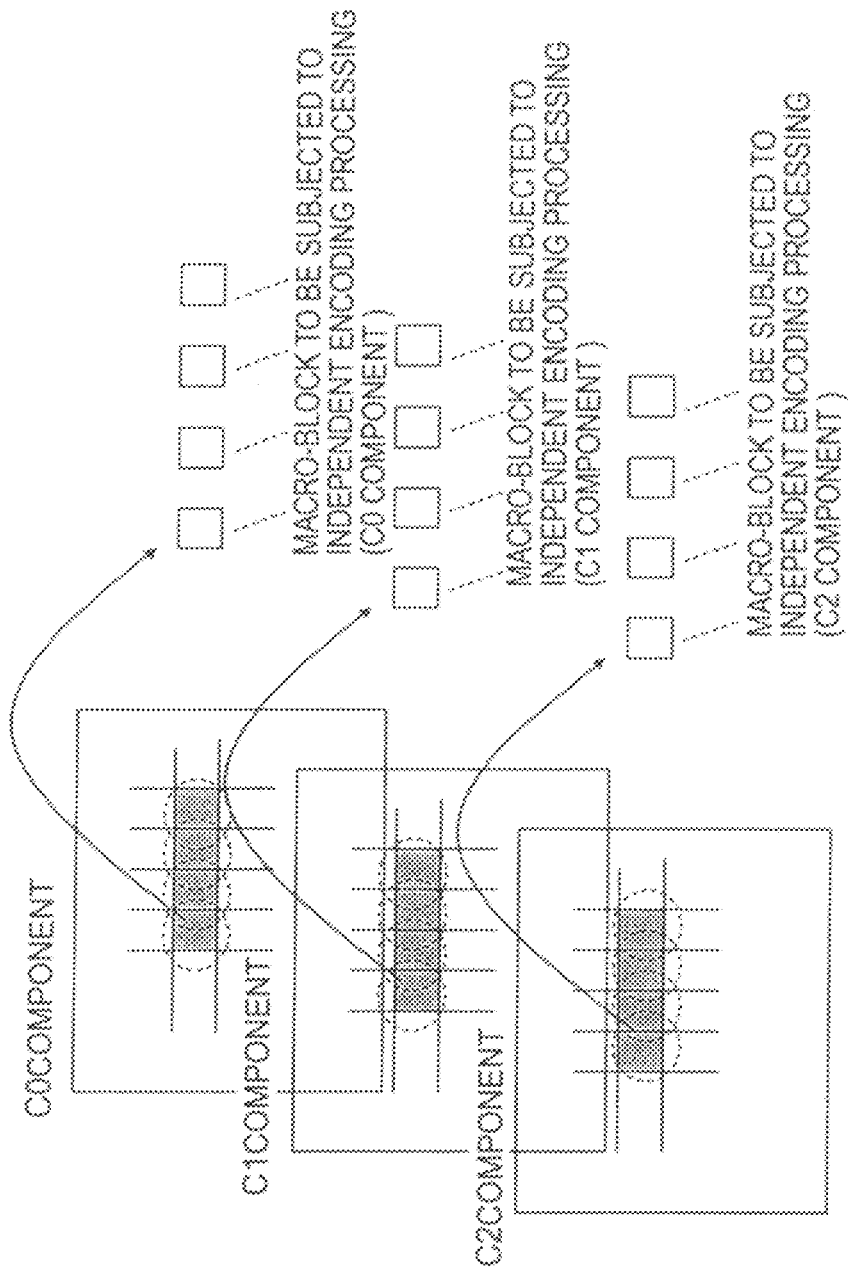
FIG. 7 is a diagram for explaining independent encoding processing according to the seventh embodiment of the present invention.

In the common encoding processing according to the seventh embodiment, as shown in FIG. 6, an input video signal for one frame is divided into macro-blocks to be subjected to the common encoding processing in a group of three color components of a C0 component, a C1 component, and a C2 component, respectively. On the other hand, in the independent encoding processing, as shown in FIG. 7, an input video signal for one frame is separated into three color components of a C0 component, a C1 component, and a C2 component and the three color component are divided into macro-blocks composed of single color components, that is, respective macro-blocks to be subjected to the independent encoding processing for the respective C0 component, C1 component, and C2 component.

The macro-blocks to be subjected to the common encoding processing include samples of the three color components of C0, C1, and C2. The macro-blocks to be subjected to the independent encoding processing include samples of any one of C0, C1, and C2 components.

Figure 8:
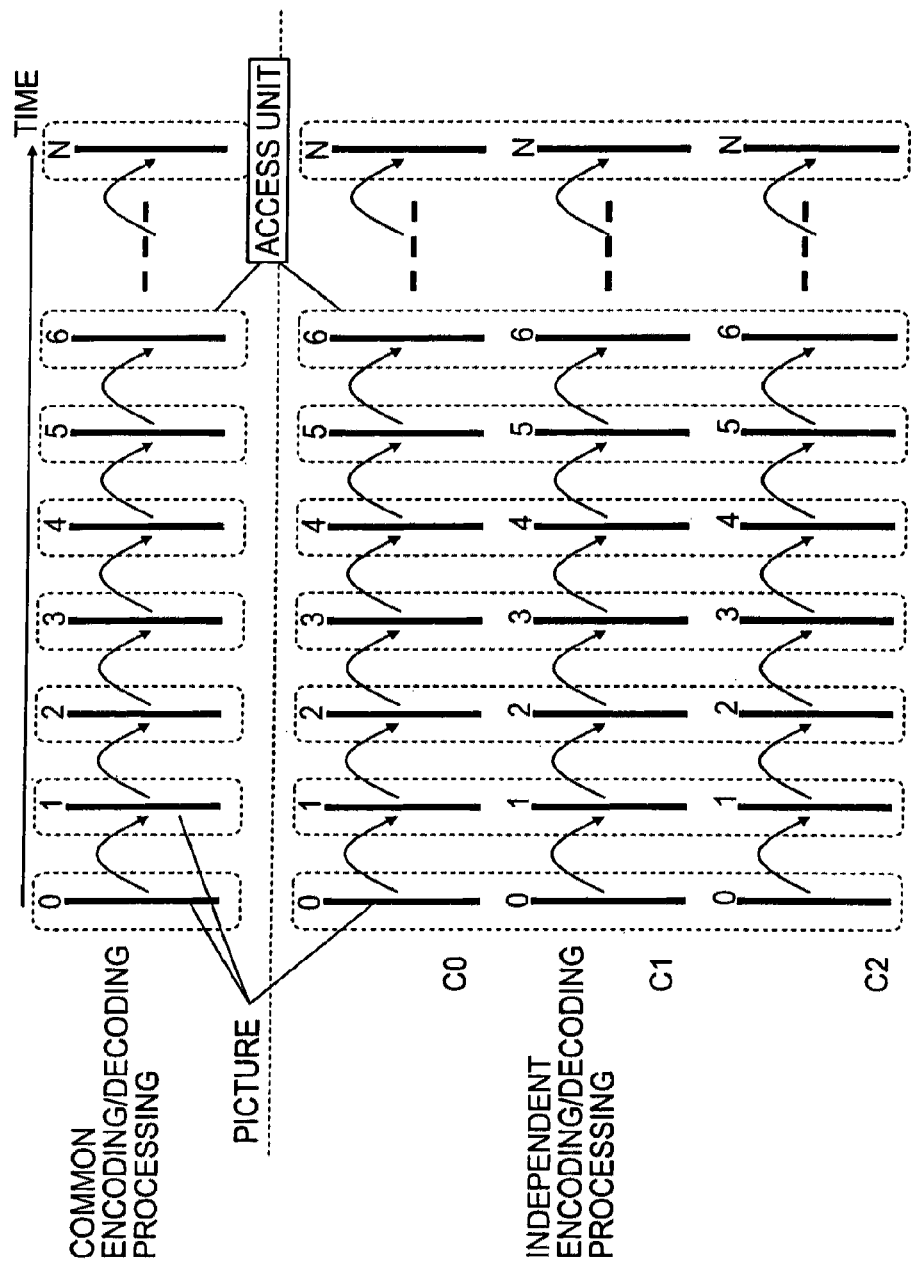
FIG. 8 is a diagram showing a motion prediction reference relation in a time direction among pictures in an encoder and a decoder according to the seventh embodiment of the present invention.

In FIG. 8, a motion prediction reference relation in a time direction among pictures in an encoder and a decoder according to the seventh embodiment is shown. In this example, a data unit indicated by a bold vertical bar line is set as a picture and a relation between the picture and an access unit is indicated by a surrounding dotted line. In the case of the common encoding and decoding processing, one picture is data representing a video signal for one frame in which three color components are mixed. In the case of the independent encoding and decoding processing, one picture is a video signal for one frame of any one of the color components.

The access unit is a minimum data unit for giving a time stamp for synchronization with audio/sound information or the like to a video signal. In the case of the common encoding and decoding processing, data for one picture is included in one access unit.

On the other hand, in the case of the independent encoding and decoding processing, three pictures are included in one access unit. This is because, in the case of the independent encoding and decoding processing, a reproduction video signal for one frame is not obtained until pictures at the identical display time for all the three color components are obtained. Numbers affixed above the respective pictures indicate an order of the encoding and decoding processing in a time direction of the pictures (frame_num of the AVC (Advanced Video Coding), which is a standard of a compression encoding system for moving image data).

In FIG. 8, arrows among the pictures indicate a reference direction of motion prediction. In the case of the independent encoding and decoding processing, motion prediction reference among pictures included in an identical access unit and motion prediction reference among different color components are not performed. Pictures of the respective color components of C0, C1, and C2 are encoded and decoded while predicting and referencing motion only for signals of identical color components.

With such the structure, in the case of the independent encoding and decoding processing according to the seventh embodiment, it is possible to execute encoding and decoding of the respective color components without relying on encoding and decoding processing of the other color components at all. Thus, it is easy to perform parallel processing.

In the AVC, an IDR (instantaneous decoder refresh) picture that performs intra-encoding by itself and resets contents of a reference image memory used for motion compensation prediction is defined. Since the IDR picture is decodable without relying on any other pictures, the IDR picture is used as a random access point.

In an access unit in the case of the common encoding processing, one access unit is one picture. However, in an access unit in the case of the independent encoding processing, one access unit is constituted by a plurality of pictures. Thus, when a certain color component picture is an IDR picture, assuming that the other remaining color component pictures are also IDR pictures, an IDR access unit is defined to secure a random access function.

In the following explanation, identification information (information equivalent to an inter-prediction mode common identification flag or a macro-block header common identification flag) indicating whether encoding by the common encoding processing is performed or encoding by the independent encoding processing is performed is referred to as a common encoding/independent encoding identification signal.

Figure 9:
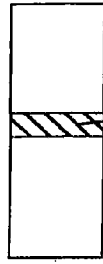
FIG. 9 is a diagram showing an example of a structure of a bit stream generated in the encoder and subjected to input and decoding processing by the decoder according to the seventh embodiment of the present invention.

In FIG. 9, a structure of a bit stream that is generated by the encoder according to the seventh embodiment and subjected to input and decoding processing by the decoder according to the seventh embodiment is shown. In the figure, a bit stream structure from a sequence level to a frame level is shown. First, a common encoding/independent encoding identification signal is multiplexed with an upper header of the sequence level (in the case of the AVC, SPS (sequence parameter set), etc.).

Respective frames are encoded in a unit of the access unit. An AUD indicates an Access Unit Delimiter NAL unit that is a unique NAL unit for identifying a break of the access unit in the AVC. When the common encoding/independent encoding identification signal indicates "picture encoding by the common encoding processing", encoded data for one picture is included in the access unit.

It is assumed that the picture in this case is data representing a video signal for one frame in which three color components are mixed as described above. In this case, encoded data of an ith access unit is constituted as a set of slice data Slice(i,j), and "j" is an index of slice data in one picture.

On the other hand, when the common encoding/independent encoding identification signal indicates "picture encoding by the independent encoding processing", one picture is a video signal for one frame of any one of color components. In this case, encoded data of a pth access unit is constituted as a set of slice data Slice(p,q,r) of a qth picture in the access unit, and "r" is an index of slice data in one picture. In the case of a video signal constituted by three color components such as RGB, "q" is any one of 0, 1, and 2.

In a case, for example, where when additional data such as permeability information for alpha blending is encoded and decoded as an identical access unit in addition to a video signal including the three primary colors or a case where when a video signal constituted by color components (e.g., YMCK used in color printing) equal to or more than four components is encoded and decoded, "q" may be larger than 3.

If the independent encoding processing is selected, the encoder and the decoder according to the seventh embodiment encode respective color components constituting a video signal entirely independently from one another. Thus, it is possible to freely change the number of pieces of the color components without changing the encoding and decoding processing in principle. There is an effect that, even when a signal format for performing color representation of a video signal is changed in future, it is possible to cope with the change based on the independent encoding processing according to the seventh embodiment.

In order to realize such the structure, in the seventh embodiment, the common encoding/independent encoding identification signal is represented as a form of "the number of pictures included in one access unit and independently encoded without being subjected to motion prediction reference one another".

A common encoding/independent encoding identification signal 3 is referred to as num_pictures_in_au below. In other words, num_pictures_in_au=1 indicates the "common encoding processing" and num_pictures_in_au=3 indicates the "independent encoding processing" according to the seventh embodiment. When there are four or more color components, num_pictures_in_au only has to be set to a value larger than 3.

By performing such signaling, if the decoder decodes and refers to num_pictures_in_au, the decoder can not only distinguish encoded data by the common encoding processing and encoded data by the independent encoding processing but also simultaneously learn how many pictures of single color component are present in one access unit. Thus, it is possible to treat the common encoding processing and the independent encoding processing seamlessly in a bit stream while making it possible to cope with extension of color representation of a video signal in future.

Figure 10:
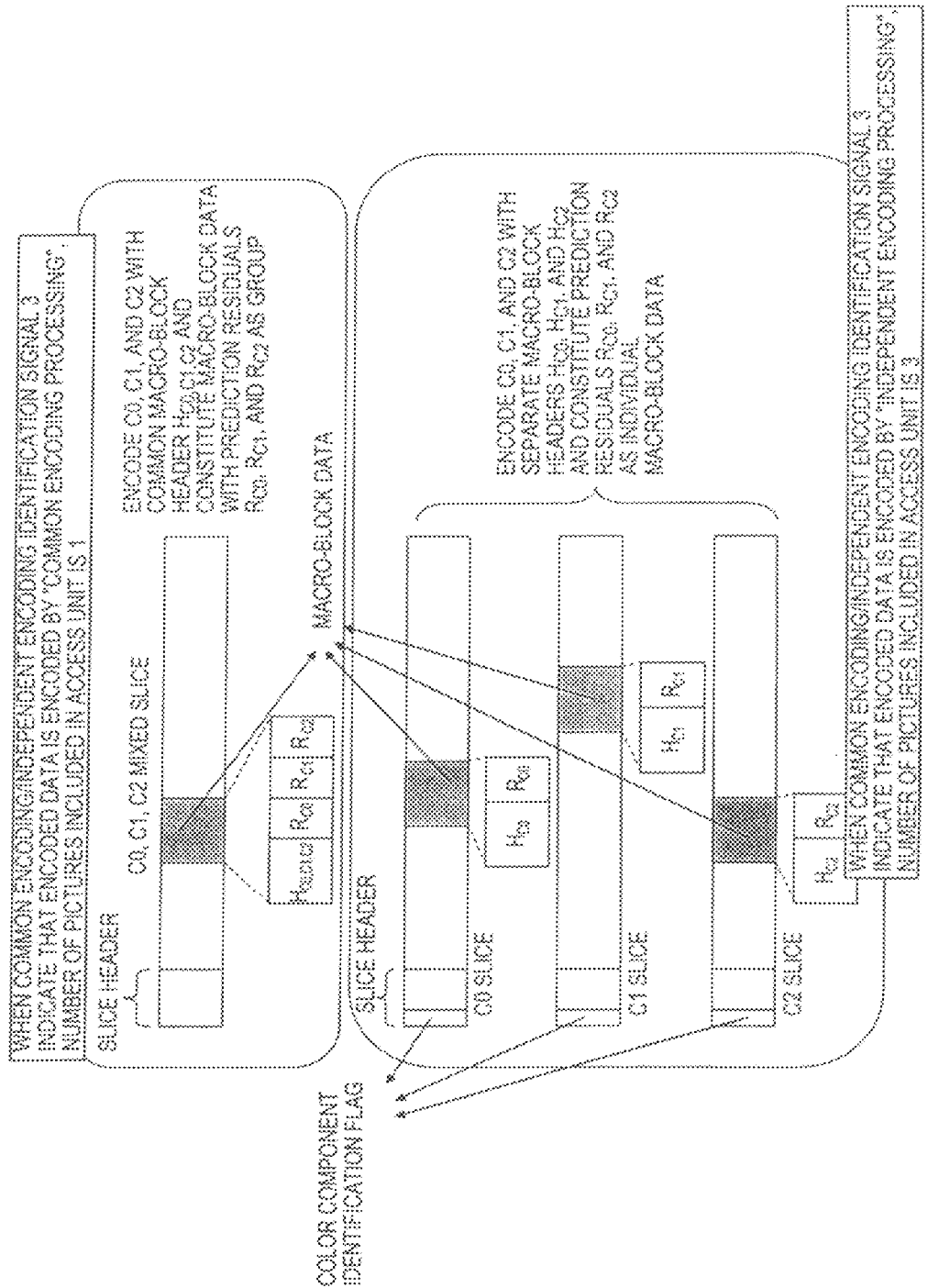
FIG. 10 is a diagram showing bit stream structures of slice data in the cases of the common encoding processing and the independent encoding processing according to the seventh embodiment of the present invention.

Bit stream structures of slice data in the case of the common encoding processing and the independent encoding processing are shown in FIG. 10. In a bit stream encoded by the independent encoding processing, in order to attain effects described later, a color component identification flag (color_channel_idc) is given to a header region at the top of slice data received by the decoder such that it is possible to identify to which color component picture in an access unit the slice data belongs.

Color_channel_idc groups slices having the same value of color_channel_idc. In other words, among slices having different values of color_channel_idc, no dependency of encoding and decoding (e.g., motion prediction reference, context modeling/occurrence probability learning, etc. of CABAC (Context-Adaptive Binary Arithmetic Coding)) is given. Color_channel_idc is the same as color_id according to the first embodiment shown in part (d) of FIG. 1 and is information of the same semantics.

With such prescription, independence of respective pictures in an access unit in the case of the independent encoding processing is secured. Frame_num (an order of encoding and decoding processing of a picture to which a slice belongs) multiplexed with respective slice header is set to an identical value in all color component pictures in one access unit.

Figure 11:
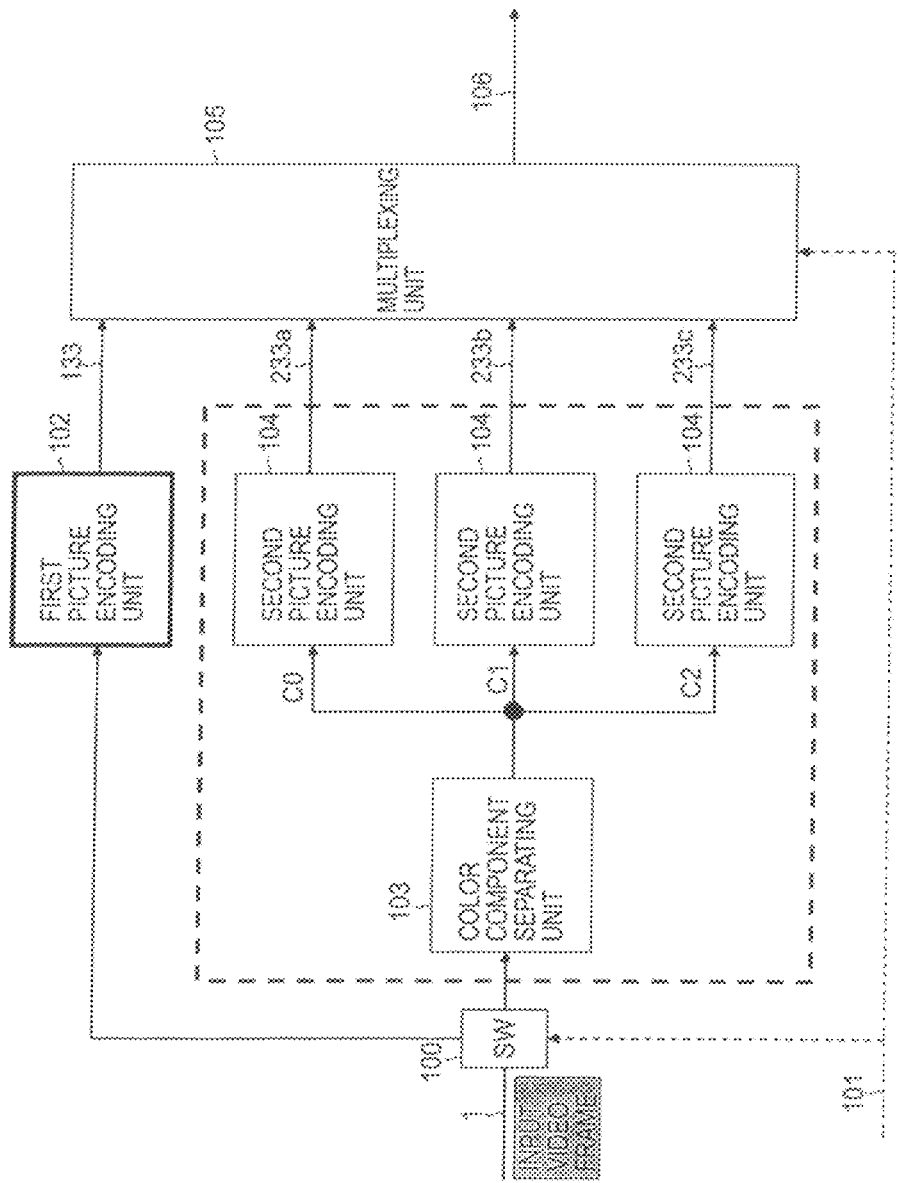
FIG. 11 is a block diagram showing a schematic structure of the encoder according to the seventh embodiment of the present invention.

A schematic structure of the encoder according to the seventh embodiment is shown in FIG. 11. In the figure, the common encoding processing is executed in a first picture encoding unit 102 and the independent encoding processing is executed in second picture encoding units 104 (prepared for three color components). A video signal 1 is supplied to the first picture encoding unit 102 or a color component separating unit 103 and any one of the second picture encoding units 104 for each color component by a switch (SW) 100. The switch 100 is driven by a common encoding/independent encoding identification signal 101 and supplies the input video signal 1 to a designated path.

In the following, description is made on a case where the common encoding/independent encoding identification signal (num_pictures_in_au) 101 is a signal multiplexed with a sequence parameter set when an input video signal is a signal of the 4:4:4 format and used for selecting the common encoding processing and the independent encoding processing in a unit of sequence.

When the common encoding processing is used, it is necessary to execute the common decoding processing on the decoder side. When the independent encoding processing is used, it is necessary to execute the independent decoding processing on the decoder side. Thus, it is necessary to multiplex the common encoding/independent encoding identification signal 101 with a bit stream as information designating the processing. Therefore, the common encoding/independent encoding identification signal 101 is inputted to the multiplexing unit 105. A unit of the multiplexing of the common encoding/independent encoding identification signal 101 may be any unit such as a unit of GOP (Group Of Pictures) composed of several picture groups in a sequence as long as the unit is in a layer higher than the pictures.

In order to execute the common encoding processing, the first picture encoding unit 102 divides the input video signal 1 into the macro-blocks in a group of samples of three color components as shown in FIG. 6 and advances the encoding processing in that unit. The encoding processing in the first picture encoding unit 102 will be described later.

When the independent encoding processing is selected, the input video signal 1 is separated into data for one frame of C0, C1, and C2 in the color component separating unit 103 and supplied to the second picture encoding units 104 corresponding thereto, respectively. The second picture encoding units 104 divide a signal for one frame separated for each color component into the macro-blocks of the format shown in FIG. 7 and advance the encoding processing in that unit. The encoding processing in the second picture encoding units will be described later.

A video signal for one picture composed of three color components is inputted to the first picture encoding unit 102. Encoded data is outputted as a bit stream 133. A video signal for one picture composed of single color component is inputted to the second picture encoding units 104. Encoded data are outputted as bit streams 233*a* to 233*c*.

These bit streams are multiplexed into a format of a bit stream 106 in the multiplexing unit 105 on the basis of a state of the common encoding/independent encoding identification signal 101 and outputted. In other words, the multiplexing unit 105 multiplexes, with the bit streams, encoded data obtained by independently encoding input image signals of the respective color components and a parameter indicating to which color component data the encoded data corresponds.

In multiplexing of the bit stream 106, in the access unit in the case in which the independent encoding processing is performed, it is possible to interleave an order of multiplexing and an order of transmission in a bit stream of slice data among pictures (respective color components) in the access unit.

Figure 12:
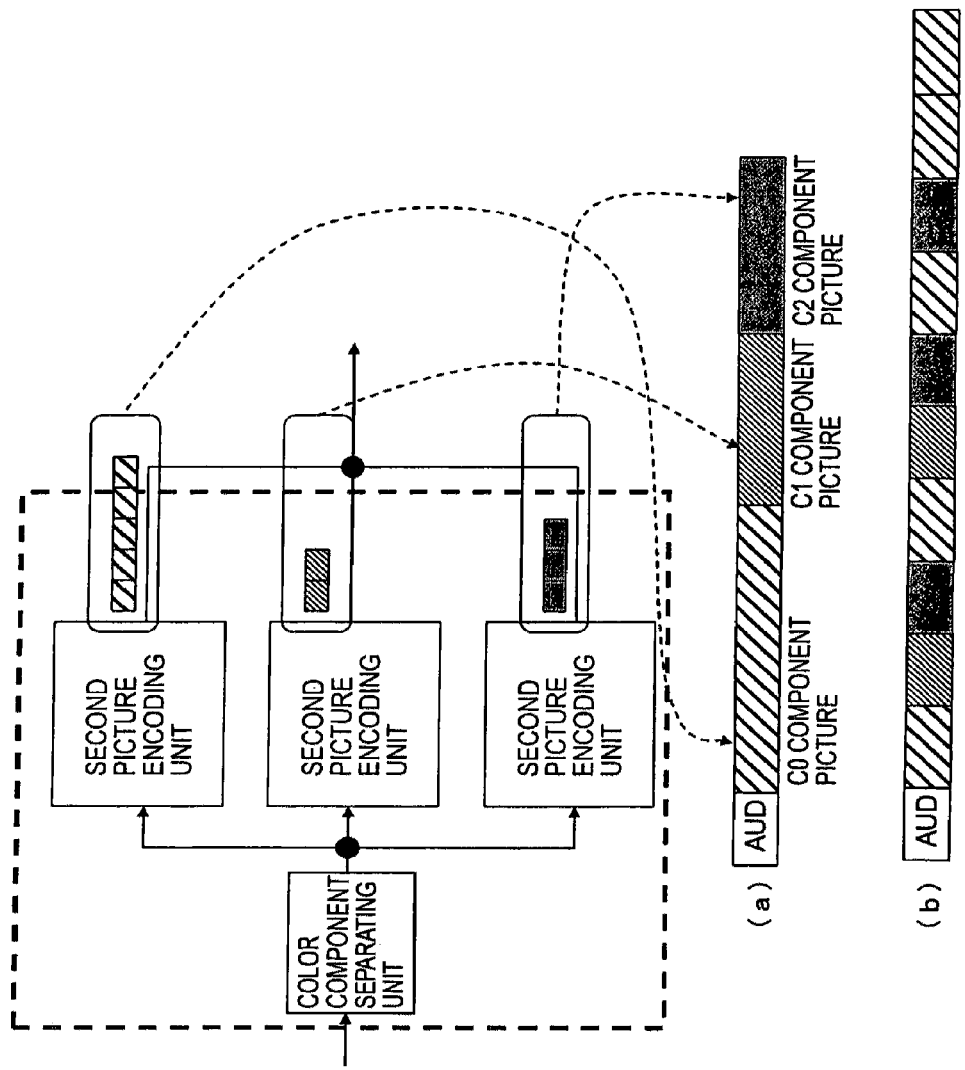
FIG. 12 is a diagram for explaining a bit stream 106 multiplexed and outputted by a multiplexing unit 105 shown in FIG. 11.

FIG. 12 shows a case (a) in which slice interleave in the access unit is impossible and a case (b) in which slice interleave is possible. In the case (a) where slice interleave is impossible, it is impossible to multiplex picture data of the C1 component with a bit stream until encoding of the C0 component is completed and it is impossible to multiplex picture data of the C2 component with the bit stream until encoding of the C0 and C1 components is completed. However, in the case (b) where slice interleave is possible, it is possible to immediately multiplex the C1 component if one slice of the C0 component is multiplexed with the bit stream and it is possible to immediately multiplex the C2 component if one slice of the C0 and C1 component is multiplexed with the bit stream.

In this case, on the decoder side, it is necessary to decide to which color component in the access unit the slice data received belongs. Therefore, a color component identification flag multiplexed with the header region of the top of the slice data as shown in FIG. 10 is used. The concept of slice interleave in FIG. 12 described here is equivalent to the concept disclosed in FIG. 3.

With such the structure, as in the encoder in FIG. 11, when the encoder encodes the pictures of the three color components according to the parallel processing using three sets of each of the second picture encoding units 6 independent from one another, it is possible to transmit encoded data without waiting for completion of encoded data of the other color component pictures as soon as slice data of a picture of the second picture encoding unit 104 is prepared.

In the AVC, it is possible to divide one picture into a plurality of slice data and encode the slice data. It is possible to flexibly change a slice data length and the number of microblocks included in a slice according to encoding conditions.

Between slices adjacent to each other on an image space, since independence of decoding processing for the slices is secured, it is impossible to use near contexts such as intra-prediction and arithmetic coding. Thus, the larger the slice data length, the higher encoding efficiency is.

On the other hand, when an error is mixed in a bit stream in a course of transmission and recording, return from the error is earlier as the slice data length is smaller and it is easy to suppress deterioration in quality. When the length and the structure of the slice, an order of the color components, and the like are fixed without multiplexing the color component identification flag, conditions for generating a bit stream are fixed in the encoder. It is impossible to flexibly cope with various conditions required for encoding.

If it is possible to constitute the bit stream as shown in FIG. 12, in the encoder, it is possible to reduce a transmission buffer size necessary for transmission, that is, a processing delay on the encoder side.

A state of the reduction in a processing delay is shown in FIG. 11. If multiplexing of slice data across pictures is not allowed, until encoding of a picture of a certain color component is completed, the encoder needs to buffer encoded data of the other pictures. This means that a delay on a picture level occurs.

On the other hand, as shown in the lowermost section in the figure, if it is possible to perform interleave on a slice level, the picture encoding unit of a certain color component can output encoded data to the multiplexing unit in a unit of slice data and can suppress the delay.

In one color component picture, slice data included in the picture may be transmitted in a raster scan order of macro-blocks or may be constituted so as to make it possible to perform interleave transmission even in one picture.

Operations of the first picture encoding unit 102 and the second picture encoding unit 104 will be hereinafter explained in detail.

Outline of Operations of the First Picture Encoding Unit 102

Figure 13:
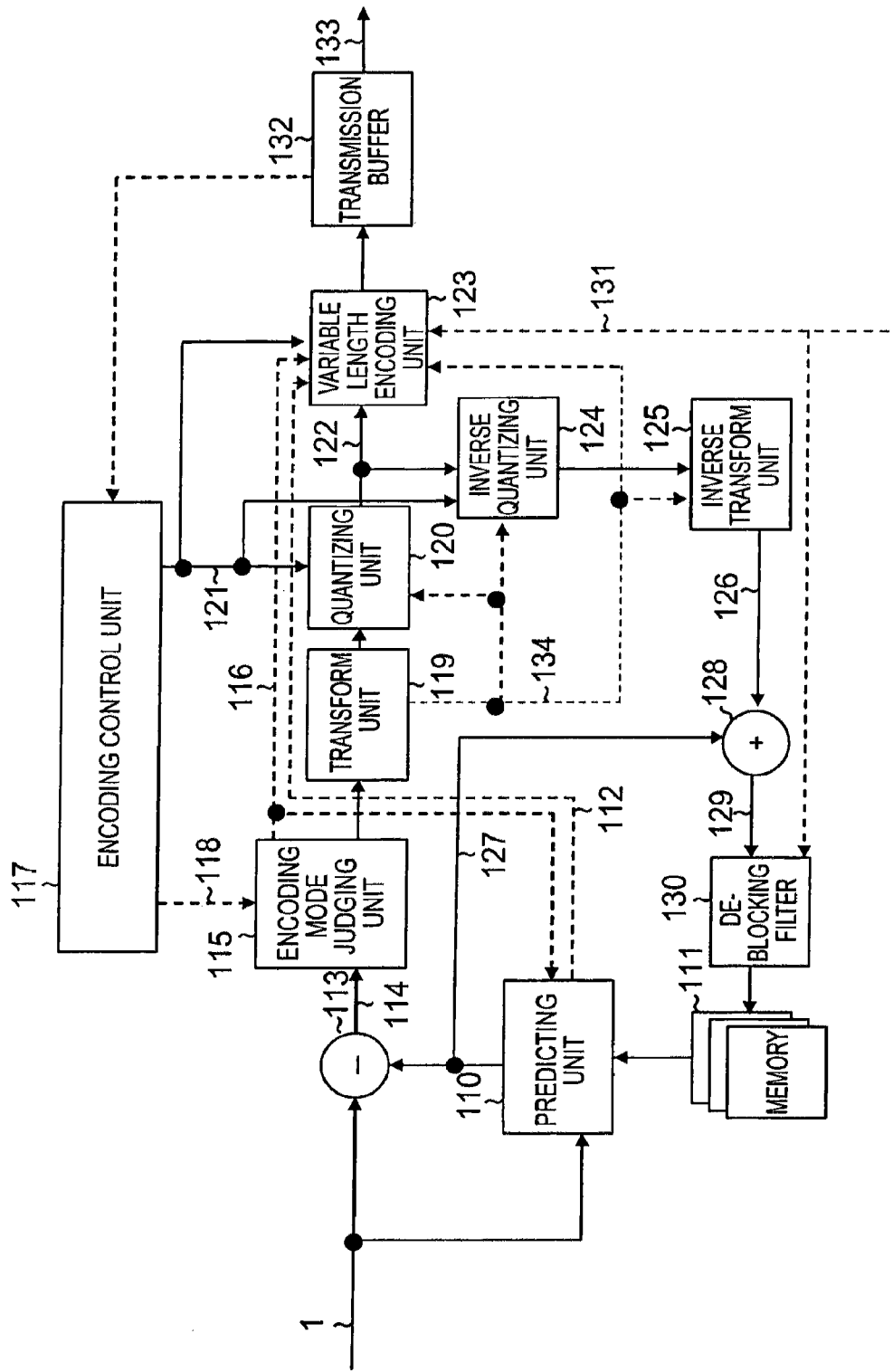
FIG. 13 is a block diagram showing an internal structure of a first picture encoding unit 102 shown in FIG. 11.

An internal structure of the first picture encoding unit 102 is shown in FIG. 13. In the figure, the input video signal 1 is inputted in the 4:4:4 format and in a unit of the macro-block in a group of three color components in the format of FIG. 6.

First, the predicting unit 110 selects a reference image out of the motion compensation prediction reference image data stored in the memory 111 and performs the motion compensation prediction processing in a unit of the macro-block. It is possible to store a plurality of pieces of reference image data constituted by three color components over a plurality of times. The predicting unit 110 selects an optimum reference image in a unit of the macro-block out of the reference image data and performs motion prediction.

As the arrangement of the reference image data in the memory 111, the reference image data may be separately stored for each of the color components in a plane sequential manner or samples of the respective color components may be stored in a dot sequential manner. Seven types are prepared as block sizes for performing motion compensation prediction. First, it is possible to select a size of any one of 16×16, 16×8, 8×16, and 8×8 in macro-block units. Moreover, when 8×8 is selected, it is possible to select a size of any one of 8×8, 8×4, 4×8, and 4×4 for each 8×8 block.

The predicting unit 110 executes, for each macro-block size, the motion compensation prediction processing on all or a part of the block sizes of 16×16, 16×8, 8×16, and 8×8, the sub-block sizes of 8×8, 8×4, 4×8, and 4×4, motion vectors in a predetermined search range, and one or more usable reference images. The predicting unit 110 obtains a prediction differential signal 114 for each block serving as a motion compensation prediction unit using the motion vectors, and reference image identification information 112 and a subtracter 113 used for the prediction.

Prediction efficiency of the prediction differential signal 114 is evaluated in an encoding mode judging unit 115. The encoding mode judging unit 115 outputs a macro-block type/sub-macro-block type 116 and the motion vector/reference image identification information 112, with which optimum prediction efficiency is obtained for a macro-block to be predicted, out of prediction processing executed in the predicting unit 110.

All pieces of macro-block header information such as macro-block types, sub-macro-block types, reference image indexes, and motion vectors are determined as header information common to the three color components, used for encoding, and multiplexed with a bit stream.

In the evaluation of optimality of prediction efficiency, for the purpose of controlling an amount of arithmetic operation, an amount of prediction error for a predetermined color component (e.g., G component of RGB or Y component of YUV) may be evaluated. Alternatively, although an amount of arithmetic operation is increased, in order to obtain optimum prediction performance, an amount of prediction error for all color components may be comprehensively evaluated. In the final selection of the macro-block type/sub-macro-block type 116, a weight coefficient 118 for each type decided in the judgment by an encoding control unit 117 may be taken into account.

Similarly, the predicting unit 110 also executes intra-prediction. When the intra-prediction is executed, intra-prediction mode information is outputted to the signal 112. In the following explanation, when the intra-prediction and the motion compensation prediction are not specifically distinguished, as the output signal 112, the intra-prediction mode information, the motion vector information, the reference image identification number are collectively referred to as prediction overhead information. Concerning the intra-prediction, an amount of prediction error for only a predetermined color component may be evaluated or an amount of prediction error for all the color components may be comprehensively evaluated. Finally, the predicting unit 110 selects the intra-prediction or the inter-prediction of the macro-block type by evaluating the macro-block type according to prediction efficiency or encoding efficiency in the encoding mode judging unit 115.

The predicting unit 110 outputs the macro-block type/sub-macro-block type 116 selected and the prediction differential signal 114 obtained by the intra-prediction and the motion compensation prediction based on the prediction overhead information 112 to a transform unit 119. The transform unit 119 transforms the prediction differential signal 114 inputted and outputs the prediction differential signal 114 to a quantizing unit 120 as a transform coefficient. In this case, a size of a block serving as a unit for transform may be selected from 4×4 and 8×8. When the transform block size is made selectable, a block size selected at the time of encoding is reflected on a value of a transform block size designation flag 134 and the flag is multiplexed with the bit stream.

The quantizing unit 120 quantizes the transform coefficient inputted on the basis of a quantization parameter 121 decided by the encoding control unit 117 and outputs the transform coefficient to a variable length encoding unit 123 as a quantized transform coefficient 122. The quantized transform coefficient 122 includes information for the three color components and entropy-encoded by means of Huffman coding, arithmetic coding, or the like in the variable length encoding unit 123.

The quantized transform coefficient 122 is restored to a local decoding prediction differential signal 126 through an inverse quantizing unit 124 and an inverse transform unit 125. The quantized transform coefficient 122 is added to a predicted image 127 generated on the basis of the selected macro-block type/sub-macro-block type 116 and the prediction overhead information 112 by an adder 128. Consequently, a local decoded image 129 is generated. After being subjected to block distortion removal processing in a de-blocking filter 130, the local decoded image 129 is stored in the memory 111 to be used in the following motion compensation prediction processing.

A de-blocking filter control flag 131 indicating whether a de-blocking filter is applied to the macro-block is also inputted to the variable length encoding unit 123.

The quantized transform coefficient 122, the macro-block type/sub-macro-block type 116, the prediction overhead information 112, and the quantization parameter 121 inputted to the variable length encoding unit 123 are arranged and shaped as a bit stream in accordance with a predetermined rule (syntax) and outputted to a transmission buffer 132 as NAL-unit encoded data in a unit of slice data in one or a group of a plurality of macro-blocks of the format shown in FIG. 6.

The transmission buffer 17 smoothes the bit stream according to a band of a transmission line to which the encoder is connected and readout speed of a recording medium, and outputs the bit stream as a video stream 133. The transmission buffer 17 applies feedback to the encoding control unit 117 according to an accumulation state of bit streams in the transmission buffer 133 and controls an amount of generated codes in the following encoding of video frames.

An output of the first picture encoding unit 102 is a slice of a unit of three components and is equivalent to an amount of codes in a unit of a group of access units. Thus, the transmission buffer 132 may be arranged in the multiplexing unit 105 as it is.

In the first picture encoding unit 102 according to the seventh embodiment, it is possible to decide that all slice data in a sequence are a slice in which C0, C1, and C2 are mixed (i.e., slice in which pieces of information of the three color components are mixed) according to the common encoding/independent encoding identification signal 101. Thus, a color component identification flag is not multiplexed with a slice header.

Outline of Operations of the Second Picture Encoding Unit 104

Figure 14:
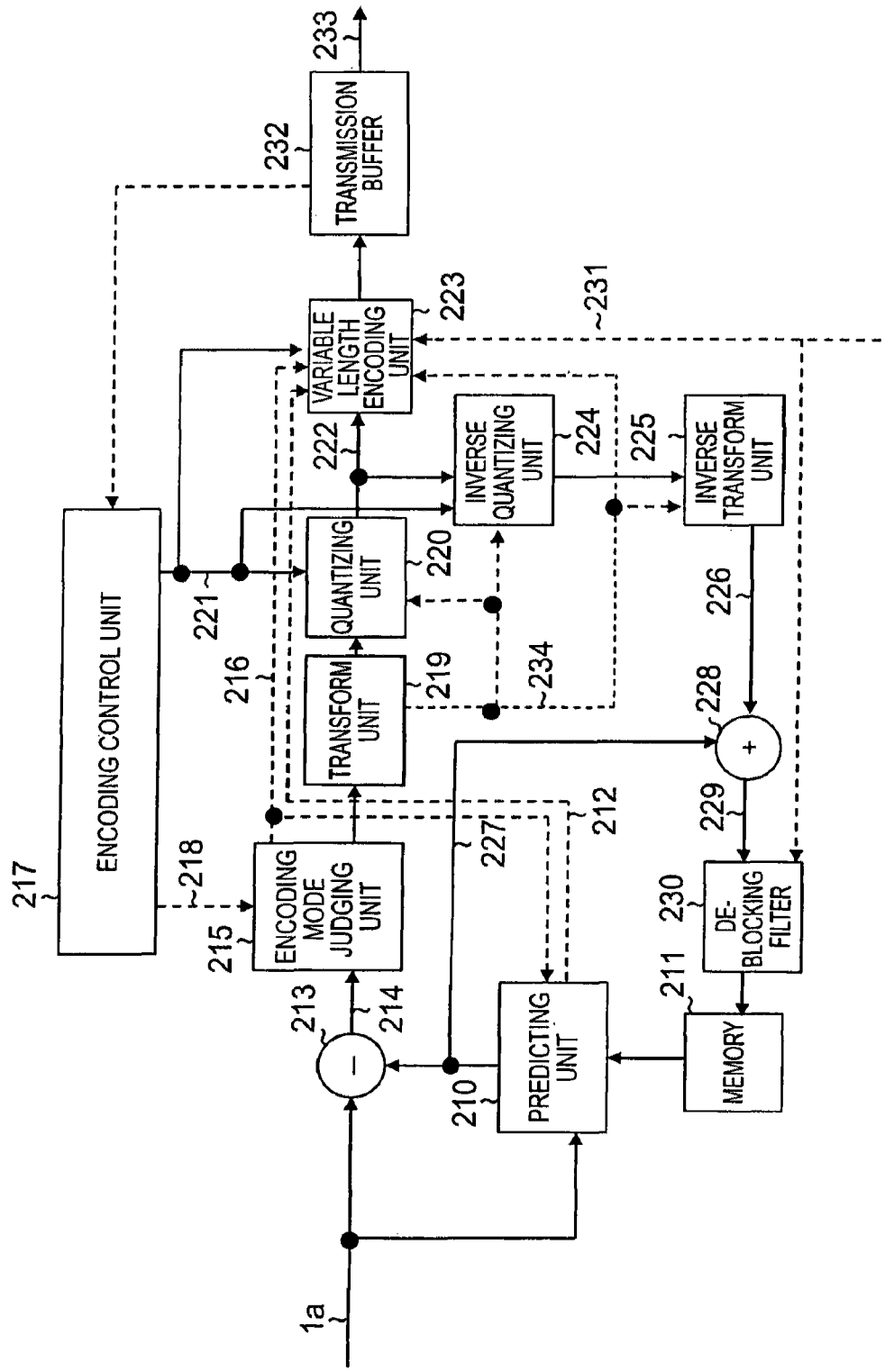
FIG. 14 is a block diagram showing an internal structure of a second picture encoding unit 104 shown in FIG. 11.

An internal structure of the second picture encoding unit 104 is shown in FIG. 14. In the figure, it is assumed that an input video signal 1a is inputted in a unit of a macro-block composed of a sample of a single color component of the format shown in FIG. 7.

First, the predicting unit 210 selects a reference image out of the motion compensation prediction reference image data stored in the memory 211 and performs the motion compensation prediction processing in a unit of the macro-block. It is possible to store a plurality of pieces of reference image data constituted by a single color component over a plurality of times in the memory 211. The predicting unit 210 selects an optimum reference image in a unit of the macro-block out of the reference image data and performs motion prediction.

The memories 211 in a unit of a group of the three color components may be commonly used with the corresponding memories 111. Seven types are prepared as block sizes for performing motion compensation prediction. First, it is possible to select a size of any one of 16×16, 16×8, 8×16, and 8×8 in macro-block units. Moreover, when 8×8 is selected, it is possible to select a size of any one of 8×8, 8×4, 4×8, and 4×4 for each 8×8 block.

The predicting unit 210 executes, for each macro-block size, the motion compensation prediction processing on all or a part of the block sizes of 16×16, 16×8, 8×16, and 8×8, the sub-block sizes of 8×8, 8×4, 4×8, and 4×4, motion vectors in a predetermined search range, and one or more usable reference images. The predicting unit 210 obtains a prediction differential signal 214 for each block serving as a motion compensation prediction unit using the motion vectors, and a reference image index 212 and a subtracter 213 used for the prediction.

Prediction efficiency of the prediction differential signal 214 is evaluated in an encoding mode judging unit 215. The encoding mode judging unit 215 outputs a macro-block type/sub-macro-block type 216 and the motion vector/reference image index 212, with which optimum prediction efficiency is obtained for a macro-block to be predicted, out of prediction processing executed in the predicting unit 210. All pieces of macro-block header information such as macro-block types, sub-macro-block types, reference image indexes, and motion vectors are determined as header information with respect to the single color component of the input video signal 1a, used for encoding, and multiplexed with a bit stream.

In the evaluation of optimality of prediction efficiency, only an amount of prediction error for a single color component to be subjected to encoding processing is evaluated. In the final selection of the macro-block type/sub-macro-block type 216, a weight coefficient 218 for each type decided in the judgment by an encoding control unit 217 may be taken into account.

Similarly, the predicting unit 210 also executes the intra-prediction. The predicting unit 110 is a block that executes both the intra-prediction and the inter-prediction. At the time of execution of the intra-prediction, intra-prediction mode information is outputted to the signal 212. In the following explanation, when the intra-prediction and the motion compensation prediction is not particularly distinguished, the signal 212 is referred to as prediction overhead information. Also, concerning the intra-prediction, only an amount of prediction error for a single color component to be subjected to encoding processing is evaluated. Finally, the predicting unit 210 selects the intra-prediction or the inter-prediction of the macro-block type by evaluating the macro-block type according to prediction efficiency or encoding efficiency in the encoding mode judging unit 115.

The predicting unit 210 outputs the macro-block type/sub-macro-block type 216 selected and the prediction differential signal 214 obtained by the prediction overhead information 212 to a transform unit 219. The transform unit 219 transforms the inputted prediction differential signal 214 of the single color component and outputs the prediction differential signal 214 to a quantizing unit 220 as a transform coefficient. In this case, a size of a block serving as a unit for transform may be selected from 4×4 and 8×8. When selection is made possible, a block size selected at the time of encoding is reflected on a value of a transform block size designation flag 234 and the flag is multiplexed with the bit stream.

The quantizing unit 220 quantizes the transform coefficient inputted on the basis of a quantization parameter 221 decided by the encoding control unit 217 and outputs the transform coefficient to a variable length encoding unit 223 as a quantized transform coefficient 222. The quantized transform coefficient 222 includes information for the single color component and entropy-encoded by means of Huffman coding, arithmetic coding, or the like in the variable length encoding unit 223.

The quantized transform coefficient 222 is restored to a local decoding prediction differential signal 226 through an inverse quantizing unit 224 and an inverse transform unit 225. The quantized transform coefficient 222 is added to a predicted image 227 generated on the basis of the selected macro-block type/sub-macro-block type 216 and the prediction overhead information 212 by an adder 228. Consequently, a local decoded image 229 is generated.

After being subjected to block distortion removal processing in a de-blocking filter 230, the local decoded image 229 is stored in the memory 211 to be used in the following motion compensation prediction processing. A de-blocking filter control flag 231 indicating whether a de-blocking filter is applied to the macro-block is also inputted to the variable length encoding unit 223.

The quantized transform coefficient 222, the macro-block type/sub-macro-block type 216, the prediction overhead information 212, and the quantization parameter 221 inputted to the variable length encoding unit 223 are arranged and shaped as a bit stream in accordance with a predetermined rule (syntax) and outputted to a transmission buffer 232 as NAL-unit encoded data in a unit of slice data in one of a group of a plurality of macro-blocks of the format shown in FIG. 7.

The transmission buffer 232 smoothes the bit stream according to a band of a transmission line to which the encoder is connected and readout speed of a recording medium, and outputs the bit stream as a video stream 233. The transmission buffer 232 applies feedback to the encoding control unit 217 according to an accumulation state of bit streams in the transmission buffer 232 and controls an amount of generated codes in the following encoding of video frames.

An output of the second picture encoding unit 104 is a slice composed of only data of a single color component. When control of an amount of codes in a unit of a group of access units is necessary, a common transmission buffer in a unit of multiplexed slices of all the color components may be provided in the multiplexing unit 105 to apply feedback to the encoding control unit 217 of the respective color components on the basis of an amount of occupation of the buffer.

In this case, the encoding control may be performed using only an amount of information on generation of all the color components or may be performed taking into account a state of the transmission buffer 232 of each of the color components as well. When the encoding control is performed using only an amount of information on generation of all the color components, it is also possible to realize a function equivalent to the transmission buffer 232 with the common transmission buffer in the multiplexing unit 105 and to omit the transmission buffer 232.

In the second picture encoding unit 104 according to the seventh embodiment, it is possible to decide that all slice data in a sequence are a single color component slice (i.e., a C0 slice, a C1 slice, or a C2 slice) according to the common encoding/independent encoding identification signal 101. Thus, a color component identification flag is always multiplexed with a slice header to make it possible to decide, on the decoder side, which slice corresponds to which picture data in an access unit.

Therefore, the respective second picture encoding units 104 can transmit outputs from the respective transmission buffers 232 at a point when data for one slice is accumulated without accumulating the outputs for one picture.

The first picture encoding unit 102 and the second picture encoding units 104 are only different in whether macroblock header information is treated as information common to three components or treated as information of a single color component and in a bit stream structure of slice data. It is possible to realize most of the basic processing blocks such as the predicting units, the transform units and the inverse transform units, the quantizing units and the inverse quantizing units, and the de-blocking filters shown in FIGS. 13 and 14 may be realized in functional blocks common to the first picture encoding unit 102 and the second picture encoding units 104 with only a difference in whether information of the three color components is processed collectively or only information of a single color component is treated.

Therefore, it is possible to realize implementation of not only the completely independent encoding processing unit shown in FIG. 11 but also various encoders by appropriately combining the basic components shown in FIGS. 13 and 14. If the arrangement of the memory 111 in the first picture encoding unit 102 is provided in a plane sequential manner, it is possible to share the structure of the reference image storage memory between the first picture encoding unit 102 and the second picture encoding unit 104.

Although not shown in the figure, in the encoder according to this embodiment, assuming the presence of an imaginary stream buffer (an encoding picture buffer) that buffers the video stream 106 complying with the arrays shown in FIGS. 9 and 10 and an imaginary frame memory (a decoding picture buffer) that buffers decoded images 313a and 313b, the video stream 106 is generated to prevent an overflow or an underflow of the encoding picture buffer and a failure of the decoding picture buffer. This control is mainly performed by the encoding control units 117 and 217.

Consequently, when the video stream 106 is decoded in accordance with operations (imaginary buffer models) of the encoding picture buffer and the decoding picture buffer in the decoder, it is guaranteed that a failure does not occur in the decoder. The imaginary buffer models are defined below.

Operations of the encoding picture buffer are performed in units of an access unit. As described above, when the common decoding processing is performed, encoded data of one picture are included in one access unit. When the independent decoding processing is performed, encoded data of pictures for the number of color components (for three pictures in the case of three components) are included in one access unit.

Operations defined for the encoding picture buffer are time when a first bit and a last bit of the access unit is inputted to the encoding picture buffer and time when a bit of the access unit is read out from the encoding picture buffer. It is defined that readout from the encoding picture buffer is instantly performed. It is assumed that all bits of the access unit are read out from the encoding picture buffer at the same time.

When a bit of the access unit is read out from the encoding picture buffer, the bit is inputted to an upper header analyzing unit. As described above, the bit is subjected to decoding processing in the first picture decoding unit or the second picture decoding unit and outputted as a color video frame bundled in units of an access unit. Processing from the readout of a bit from the encoding picture buffer and output of the image as a color video frame in units of an access unit is instantly performed in terms of the definition of the imaginary buffer model.

The color video frame constituted in units of an access unit is inputted to the decoding picture buffer and output time of the color video frame from the decoding picture buffer is calculated. The output time from the decoding picture buffer is a value calculated by adding a predetermined delay time to the readout time from the encoding picture buffer.

It is possible to multiplex this delay time with the bit stream to control the decoder. When the delay time is 0, that is, when output time from the decoding picture buffer is equal to readout time from the encoding picture, the color video frame is inputted to the decoding picture buffer and simultaneously outputted from the decoding picture buffer.

In other cases, that is, when output time from the decoding picture buffer is later than readout time from the encoding picture buffer, the color video frame is stored in the decoding picture buffer until the output time from the decoding picture buffer comes. As described above, operations from the decoding picture buffer are defined in units of an access unit.

Figure 15:
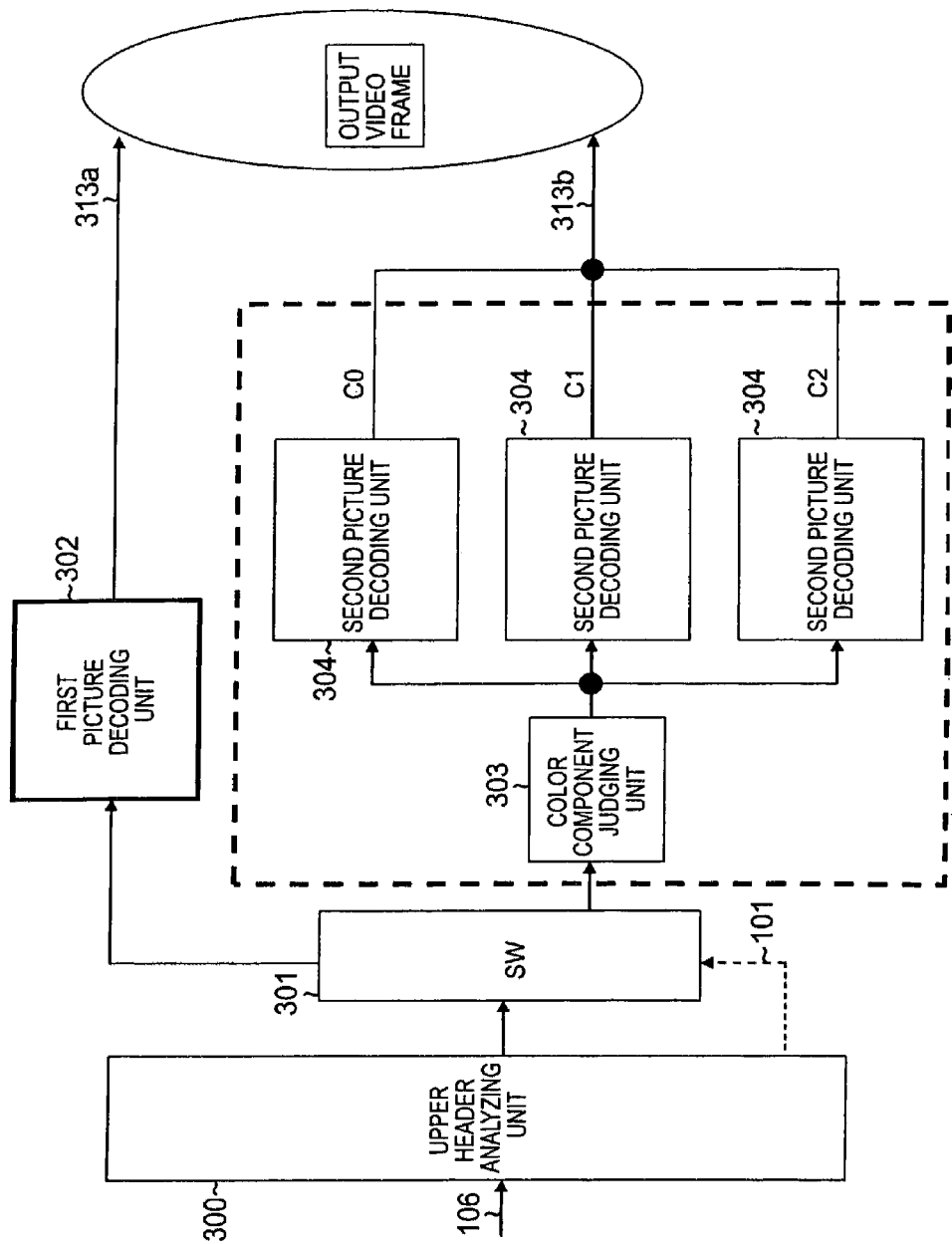
FIG. 15 is a block diagram showing a schematic structure of the decoder according to the seventh embodiment of the present invention.

A schematic structure of the decoder according to the seventh embodiment is shown in FIG. 15. In the figure, common decoding processing is executed in a first picture decoding unit 302. Independent decoding processing is executed in a color component judging unit 303 and second picture decoding units 304 (prepared for three color components).

The bit stream 106 is divided in units of a NAL unit in an upper header analyzing unit 300. Upper header information such as a sequence parameter set and a picture parameter set is decoded as it is and stored in a predetermined memory area in which the first picture decoding unit 302, the color component judging unit 303, and the second picture decoding units 304 are capable of referring to the upper header information. The common encoding/independent encoding identification signal (num_pictures_in_au) multiplexed in sequence units is decoded and held as a part of the upper header information.

The decoded num_pictures_in_au is supplied to a switch (SW) 301. If num_pictures_in_au=1, the switch 301 supplies a slice NAL unit for each picture to the first picture decoding unit 302. If num_pictures_in_au=3, the switch 301 supplies the slice NAL unit to the color component judging unit 303.

In other words, if num_pictures_in_au=1, the common decoding processing is performed by the first picture decoding unit 302. If num_pictures_in_au=3, the independent decoding processing is performed by the three second picture decoding units 304. Detailed operations of the first and the second picture decoding units will be described later.

The color component judging unit 303 is detecting means for detecting a parameter indicating to which color component decoded data corresponds. The color component judging unit 303 decides to which color component picture in a present access unit a slice NAL unit corresponds according to a value of the color component identification flag shown in FIG. 10 and distributes and supplies the slice NAL unit to an appropriate second picture decoding unit 304.

With such a structure of the decoder, there is an effect that, even if a bit stream obtained by interleaving and encoding a slice in the access unit as shown in FIG. 12 is received, it is possible to easily judge which slice belongs to which color component picture and correctly decode the bit stream.

Outline of Operations of the First Picture Decoding Unit 302

Figure 16:
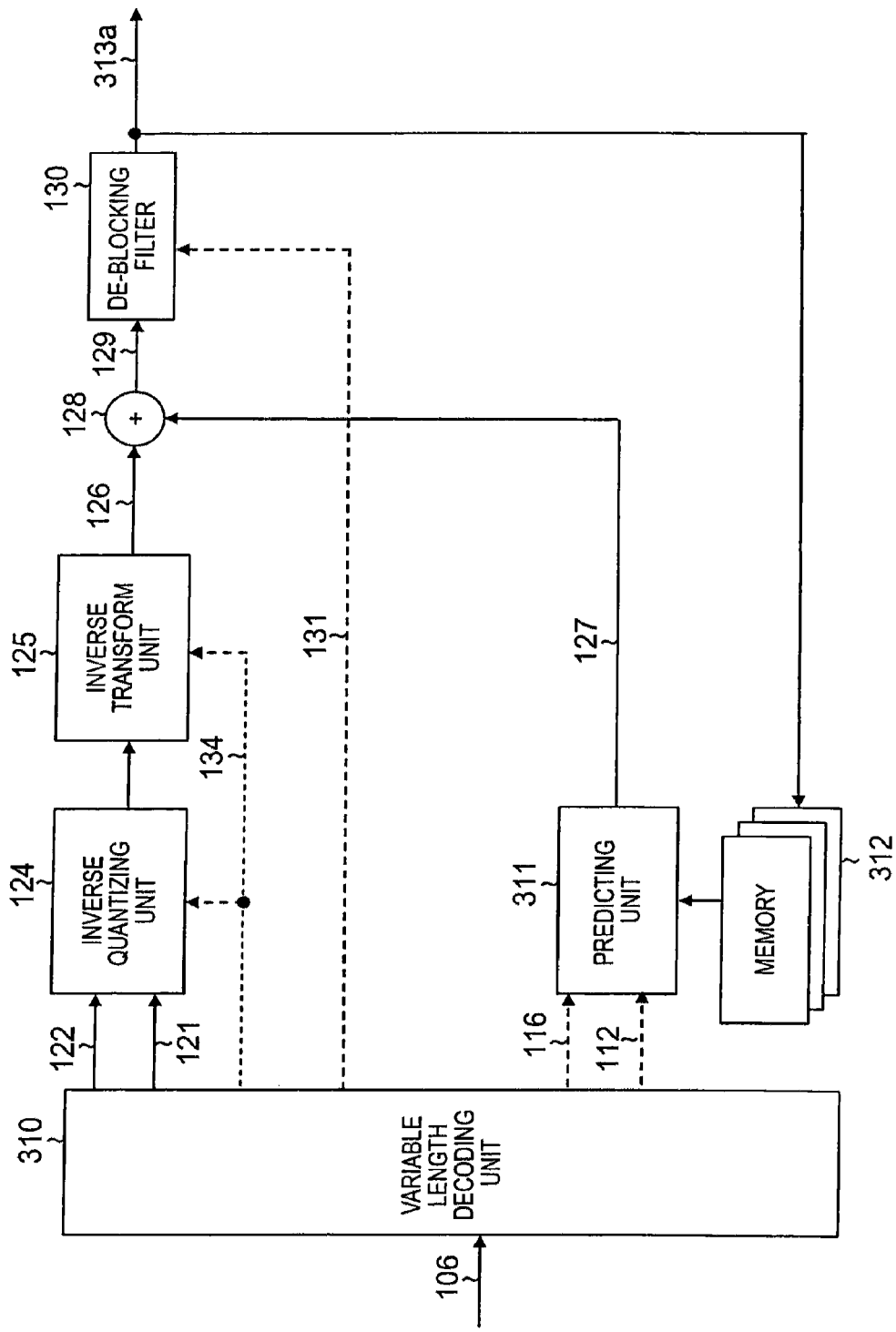
FIG. 16 is a block diagram showing an internal structure of a first picture decoding unit 302 shown in FIG. 15.

An internal structure of the first picture decoding unit 302 is shown in FIG. 16. The first picture decoding unit 302 receives the bit stream 106 complying with the arrays shown in FIGS. 9 and 10, which is outputted from the encoder shown in FIG. 11, in a unit of a mixed slice of C0, C1, and C2. The first picture decoding unit 302 performs decoding processing with a macro-block composed of samples of the three color components shown in FIG. 6 and restores an output video frame.

The bit stream 106 is inputted to a variable length decoding unit 310. The variable length decoding unit 310 interprets the bit stream 106 in accordance with a predetermined rule (syntax) and extracts the quantized transform coefficient 122 for the three components and macro-block header information (the macro-block type/sub-macro-block type 116, the prediction overhead information 112, the transform block size designation flag 134, and the quantization parameter 121) commonly used for the three components. The quantized transform coefficient 122 is inputted to the inverse quantizing unit 124, which performs the same processing as that of the first picture encoding unit 102, together with the quantization parameter 121 and subjected to inverse quantization processing.

Subsequently, an output of the inverse quantizing unit 124 is inputted to the inverse transform unit 125, which performs the same processing as that of the first picture encoding unit 102, and restored to the local decoding prediction differential signal 126 (if the transform block size designation flag 134 is present in the bit stream 106, the transform block size designation flag 134 is referred to in the inverse quantization step and the inverse transform processing step).

On the other hand, only processing of referring to the prediction overhead information 112 to generate the predicted image 127 in the predicting unit 110 in the first picture encoding unit 102 is included in the predicting unit 311. The macro-block type/sub-macro-block type 116 and the prediction overhead information 112 are inputted to the predicting unit 311 to obtain the predicted image 127 for the three components.

When the macro-block type indicates the intra-prediction, the predicted image 127 for the three components is obtained from the prediction overhead information 112 in accordance with the intra-prediction mode information. When the macro-block type indicates the inter-prediction, the predicted image 127 for the three components is obtained from the prediction overhead information 112 in accordance with the motion vector and the reference image index.

The local decoding prediction differential signal 126 and the predicted image 127 are added by the adder 128 to obtain the provisional decoded image 129 for the three components. Since the provisional decoded image 129 is used for motion compensation prediction of the following macro-blocks, after block distortion removal processing is applied to provisional decoded image samples for the three components in the de-blocking filter 130, which performs the same processing as that of the first picture encoding unit 102, the provisional decoded image 129 is outputted as a decoded image 313 and stored in a memory 312.

In this case, de-blocking filter processing is applied to the provisional decoded image 129 on the basis of an instruction of the de-blocking filter control flag 131 interpreted by the variable length decoding unit 310. A plurality of pieces of reference image data constituted by the three color components over a plurality of times are stored in the memory 312.

The predicting unit 311 selects a reference image indicated by a reference image index extracted from a bit stream in a unit of a macro-block out of the reference image data and generates a predicted image. As the arrangement of the reference image data in the memory 312, the reference image data may be separately stored for each of the color components in a plane sequential manner or samples of the respective color components may be stored in a pixel sequential manner. The decoded image 313 includes the three color components and is directly changed to a color video frame constituting an access unit 313a in the common decoding processing.

Outline of Operations of the Second Picture Decoding Unit 304

Figure 17:
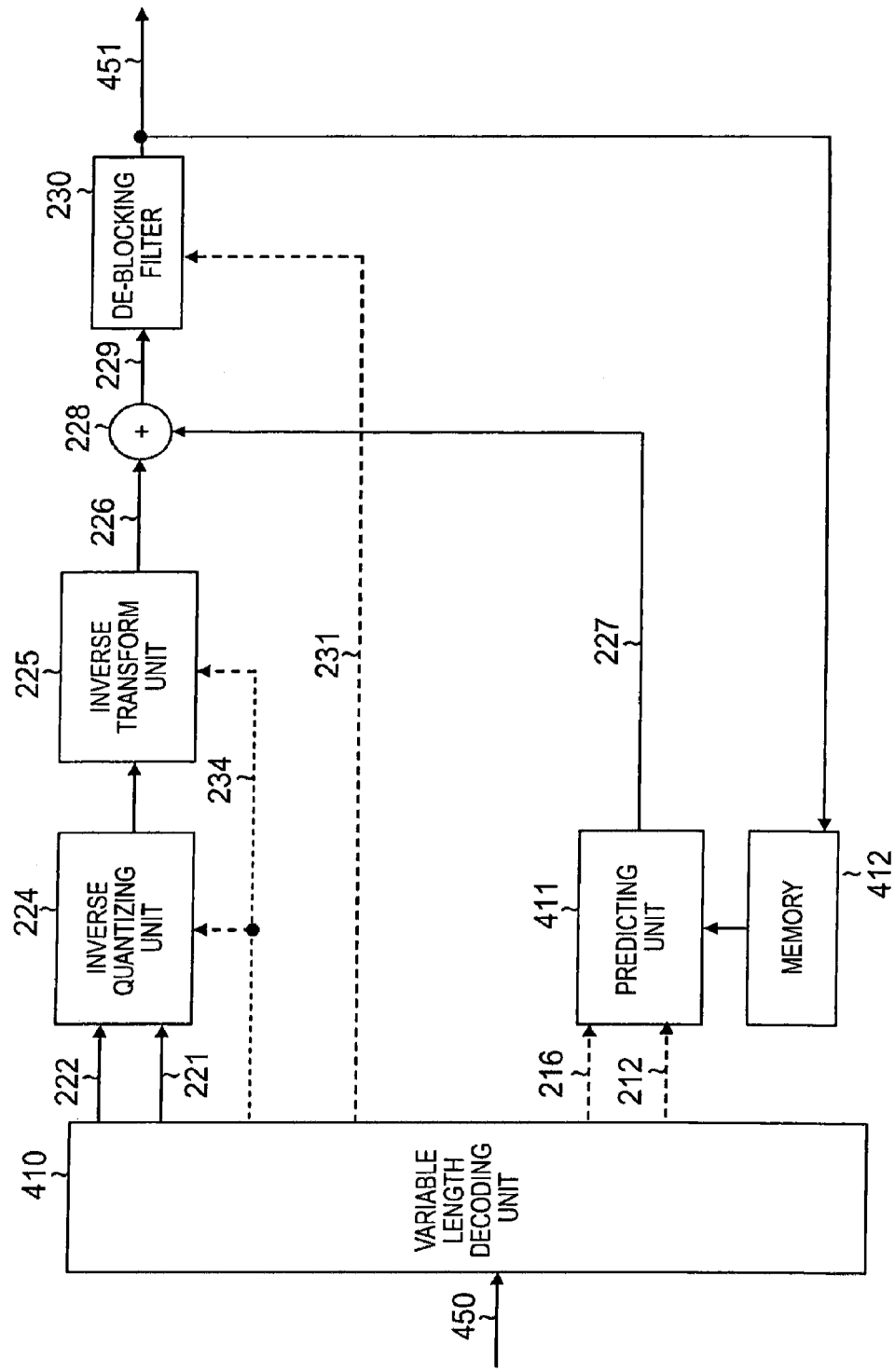
FIG. 17 is a block diagram showing an internal structure of a second picture decoding unit 304 shown in FIG. 15.

An internal structure of the second picture decoding unit 304 is shown in FIG. 17. The second picture decoding unit 304 receives the bit stream 106 complying with the arrays in FIGS. 9 and 10 outputted from the decoder shown in FIG. 11 in a unit of a C0, C1, or C2 slice NAL unit 450 allocated by the color component judging unit 303, performs decoding processing with the macro-block composed of the sample of the single color component shown in FIG. 7 as a unit, and restores an output video frame.

The bit stream 450 is inputted to a variable length decoding unit 410. The variable length decoding unit 410 interprets the bit stream 450 in accordance with a predetermined rule (syntax) and extracts a quantized transform coefficient 222 for the single color component and macro-block header information (the macro-block type/sub-macro-block type 216, the prediction overhead information 212, a transform block size designation flag 234, and a quantization parameter 221) commonly used for the single color component.

The quantized transform coefficient 222 is inputted to an inverse quantizing unit 224, which performs the same processing as that of the second picture encoding unit 104, together with the quantization parameter 221 and subjected to inverse quantization processing. Subsequently, an output of the inverse quantizing unit 224 is inputted to an inverse transform unit 225, which performs the same processing as that of the second picture encoding unit 104, and restored to a local decoding prediction differential signal 226 (if the transform block size designation flag 234 is present in the bit stream 450, the transform block size designation flag 234 is referred to in the inverse quantization step and the inverse transform processing step).

On the other hand, only processing of referring to the prediction overhead information 212 to generate a predicted image 227 in a predicting unit 210 in the second picture encoding unit 104 is included in a predicting unit 411. The macro-block type/sub-macro-block type 216 and the prediction overhead information 212 are inputted to the predicting unit 411 to obtain the predicted image 227 for the single color component.

When the macro-block type indicates the intra-prediction, the predicted image 227 for the single color component is obtained from the prediction overhead information 212 in accordance with the intra-prediction mode information. When the macro-block type indicates the inter-prediction, the predicted image 227 for the single color component is obtained from the prediction overhead information 212 in accordance with the motion vector and the reference image index.

The local decoding prediction differential signal 226 and the predicted image 227 are added by an adder 228 to obtain a provisional decoded image 229 for the single color component macro-block. Since the provisional decoded image 229 is used for motion compensation prediction of the following macro-blocks, after block distortion removal processing is applied to provisional decoded image samples for the single color component in a de-blocking filter 230, which performs the same processing as that of the second picture encoding unit 104, the provisional decoded image 229 is outputted as a decoded image 451 and stored in a memory 412.

In this case, the de-blocking filter processing is applied to the provisional decoded image 229 on the basis of an instruction of the de-blocking filter control flag 231 interpreted by the variable length decoding unit 410. The decoded image 410 includes only a sample of a single color component and is constituted as a color video frame by bundling, in units of the access unit 313b, outputs of the other respective second picture decoding units 304 to be subjected to parallel processing in FIG. 15.

As it is evident from the above, the first picture decoding unit 302 and the second picture decoding units 304 are only different in whether macro-block header information is treated as information common to the three components or treated as information of the single color component and in a bit stream structure of slice data. It is possible to realize most of the basic decoding processing blocks such as the motion compensation prediction processing, the inverse transform, and the inverse quantization shown in FIGS. 13 and 14 in functional blocks common to the first picture encoding unit 302 and the second picture encoding units 304.

Therefore, it is possible to realize implementation of not only the completely independent decoding processing unit shown in FIG. 15 but also various decoders by appropriately combining the basic components shown in FIGS. 16 and 17. Further, if the arrangement of the memory 312 in the first picture encoding unit 302 is provided in a plane sequential manner, it is possible to share the structures of the memories 312 and 412 between the first picture decoding unit 302 and the second picture decoding unit 304.

Needless to say, the decoder shown in FIG. 15 is capable of receiving and decoding a bit stream outputted from an encoder constituted to always fix the common encoding/independent encoding identification signal 3 to the "independent encoding processing" and independently encode all frames without using the first picture encoding unit 102 at all as another form of the encoder shown in FIG. 11.

As another form of the decoder shown in FIG. 15, in a form of usage on condition that the common encoding/independent encoding identification signal 3 is always fixed to the "independent encoding processing", the decoder may be constituted as a decoder that does not include the switch 301 and the first picture decoding unit 302 and only performs the independent decoding processing.

If the first picture decoding unit 302 includes a function for decoding a bit stream conforming to the AVC high profile in which the three components are collectively encoded with the conventional YUV (a signal for a format representing a color using three pieces of information of a luminance signal (Y), a difference (U) between the luminance signal and a blue component, and a difference (V) between the luminance signal and a red component) 4:2:0 format as an object and the upper header analyzing unit 300 judges by which format a bit stream is encoded with reference to a profiler identifier decoded from the bit stream 106 and communicates a result of the judgment to the switch 301 and the first picture decoding unit 302 as a part of information of a signal line of the common encoding/independent encoding identification signal 3, it is also possible to constitute a decoder that secures compatibility of the conventional YUV 4:2:0 format with the bit stream.

In the first picture encoding unit 102 in the seventh embodiment, the pieces of information of the three color components are mixed in the slice data and completely the same intra/inter-prediction processing is applied to the three color components. Accordingly, a signal correlation among the color components may remain in a prediction error signal space.

Figure 18:
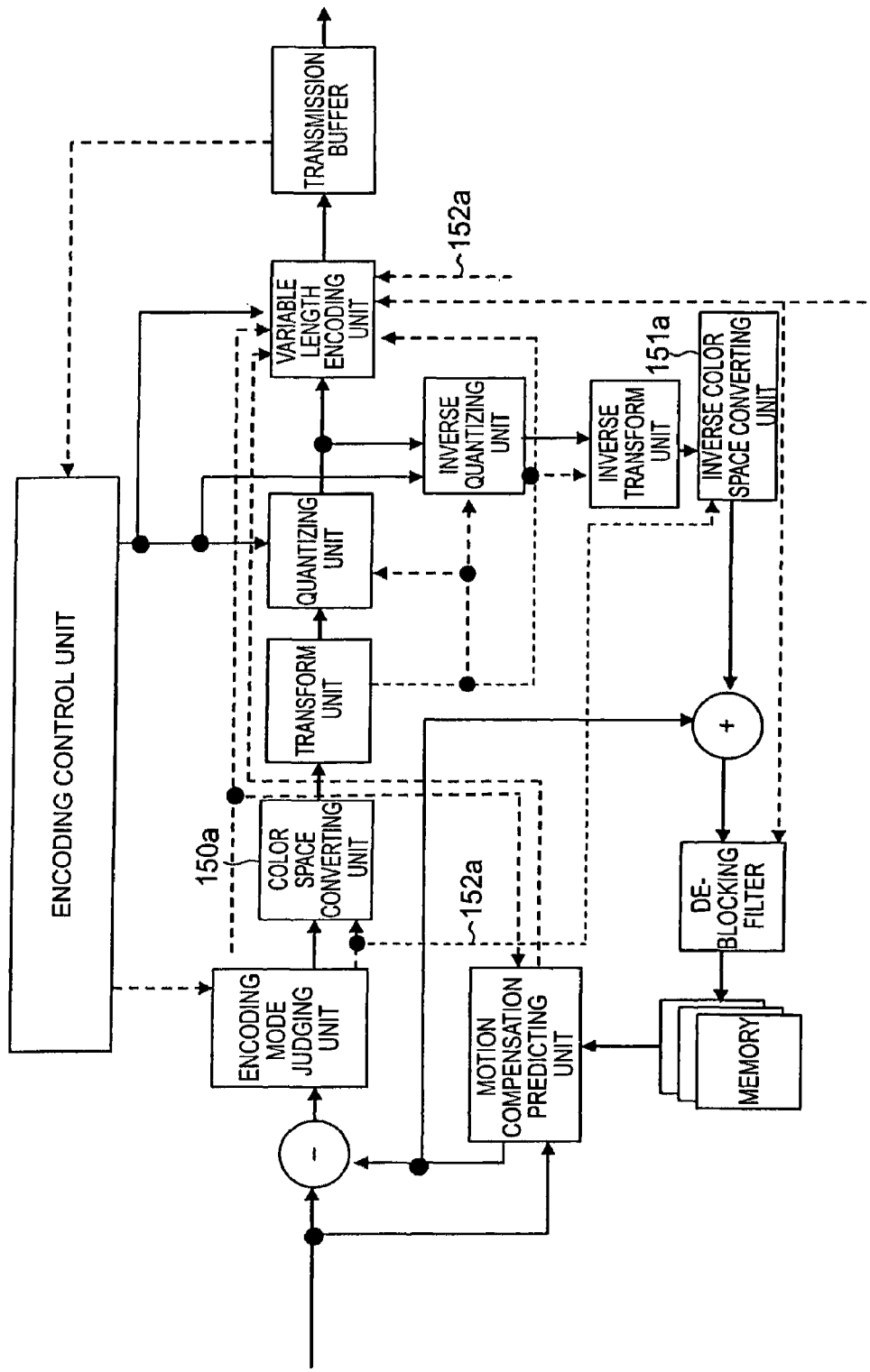
FIG. 18 is a block diagram showing a modification of an encoder shown in FIG. 11.
Figure 19:
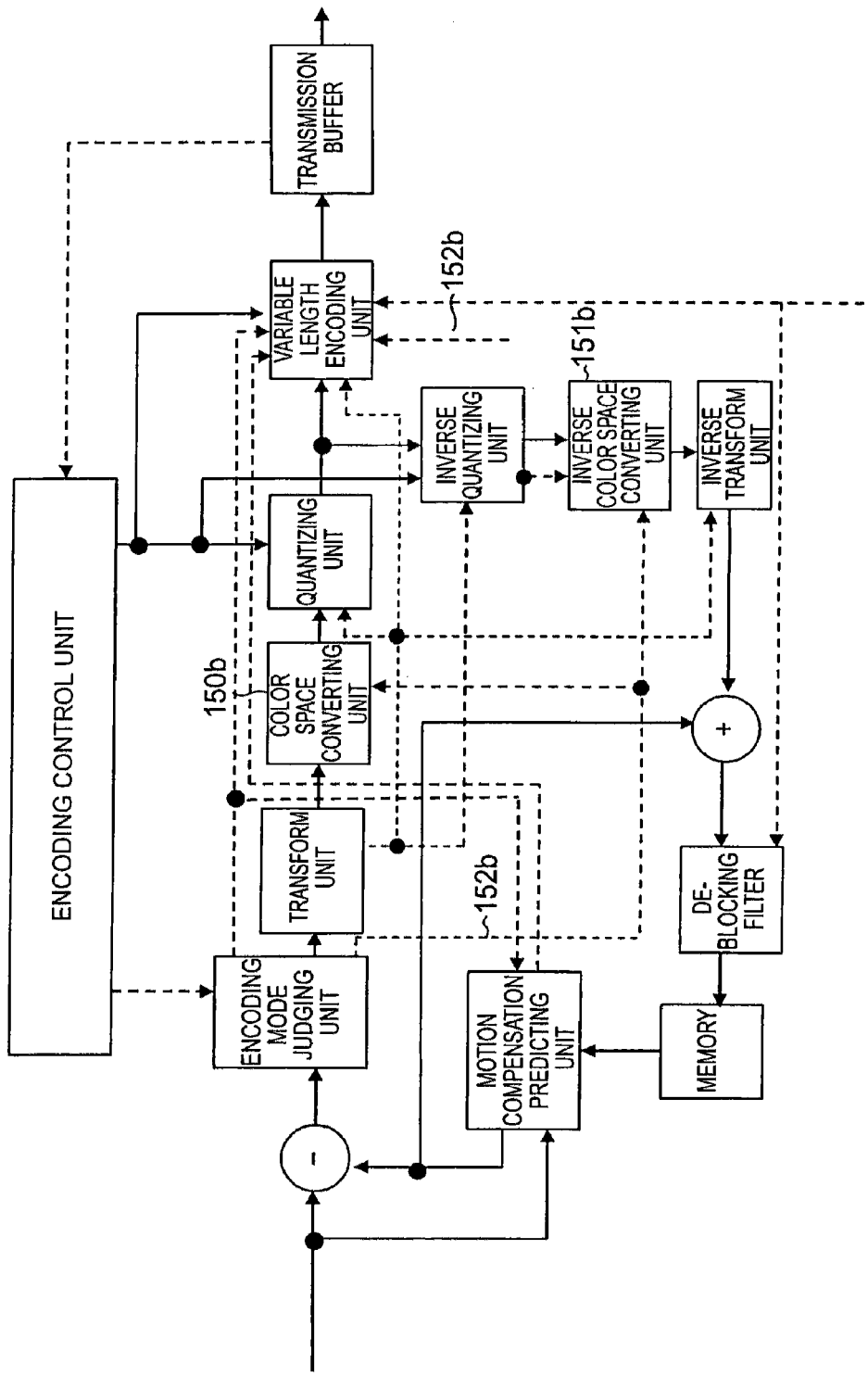
FIG. 19 is a block diagram showing another modification of the encoder shown in FIG. 11.

As a contrivance for removing the signal correlation, for example, color space transform processing may be applied to a prediction error signal. Examples of the first picture encoding unit 102 having such a structure are shown in FIGS. 18 and 19. In FIGS. 18 and 19, components are the same as those shown in FIG. 13 except for a color space transform unit and an inverse color space transform unit.

FIG. 18 is an example in which the color space transform processing is carried out on a pixel level before the transform processing is performed. A color space transform unit 150a is arranged before a transform unit and an inverse color space transform unit 151a is arranged behind an inverse transform unit.

FIG. 19 is an example in which the color space transform processing is carried out while a frequency component to be processed is appropriately selected with respect to coefficient data obtained after the transform processing is performed. A color space transform unit 150b is arranged behind a transform unit and an inverse color space transform unit 151b is arranged before an inverse transform unit. There is an effect that it is possible to control a high-frequency noise component included in a specific color component not to be propagated to other color components hardly including noise.

When a frequency component to be subjected to the color space transform processing is made adaptively selectable, pieces of signaling information 152a and 152b for judging selection of encoding time are multiplexed with a bit stream on the decoding side.

In the color space transform processing, a plurality of transform systems may be switched in macro-block units and used according to a characteristic of an image signal to be subjected to encoding or presence or absence of transform may be judged in a unit of a macro-block. It is also possible to designate types of selectable transform systems on a sequence level in advance and designate a transform system to be selected in a unit of a picture, a slice, a macro-block, or the like. It may be possible to select whether the color space transform processing is carried out before transform or after the transform.

When those kinds of adaptive encoding processing are performed, it is possible to perform evaluation of encoding efficiency for all selectable options with the encoding mode judging unit 115 or 215 to select an option with highest encoding efficiency. When those kinds of adaptive encoding processing are carried out, pieces of signaling information 152a and 152b for judging selection of encoding time are multiplexed with a bit stream on the decoding side. Such the signaling may be designated on a level different from macro-blocks such as a slice, a picture, a GOP, and a sequence.

Figure 20:
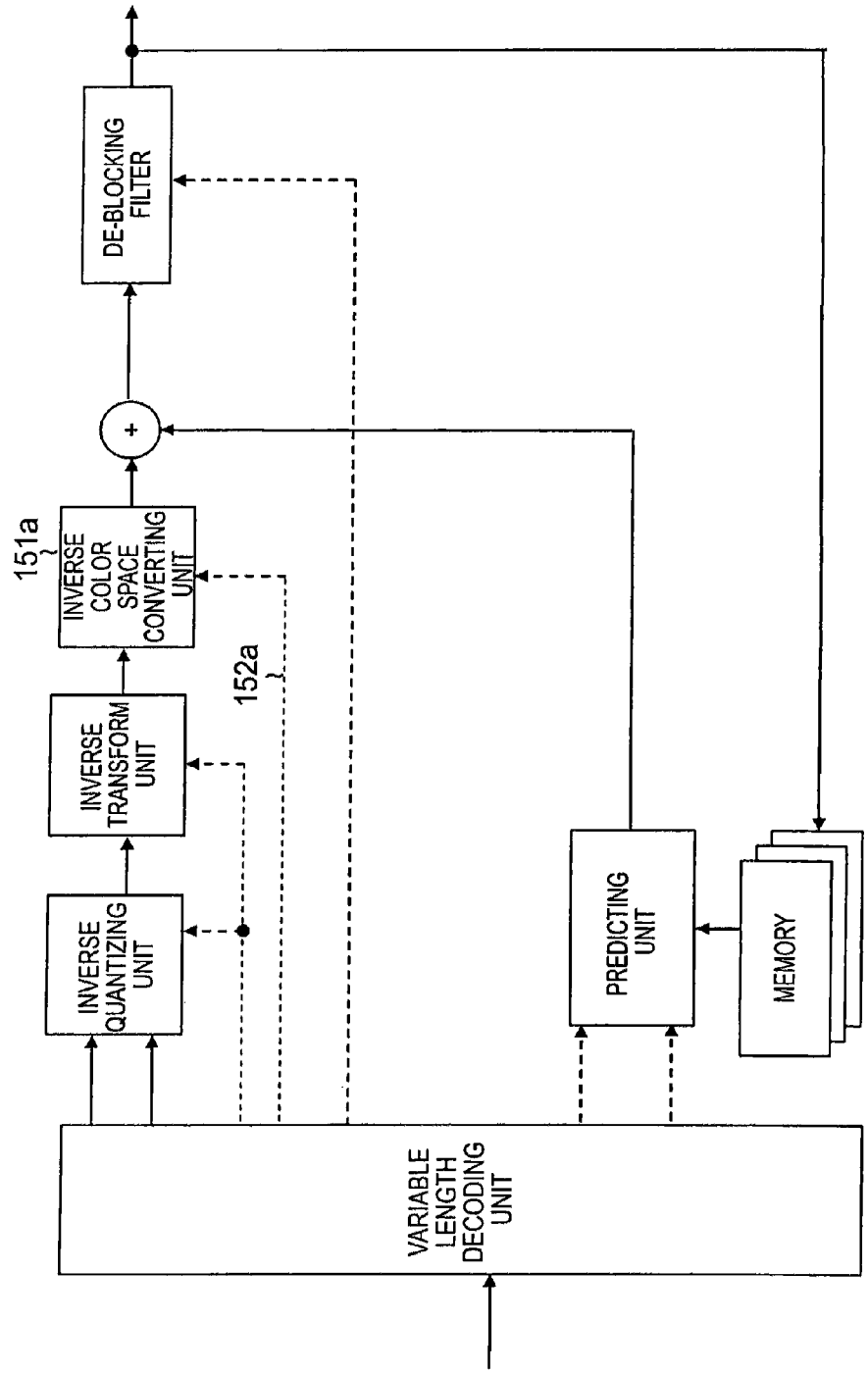
FIG. 20 is a block diagram showing a decoder corresponding to the encoder shown in FIG. 18.
Figure 21:
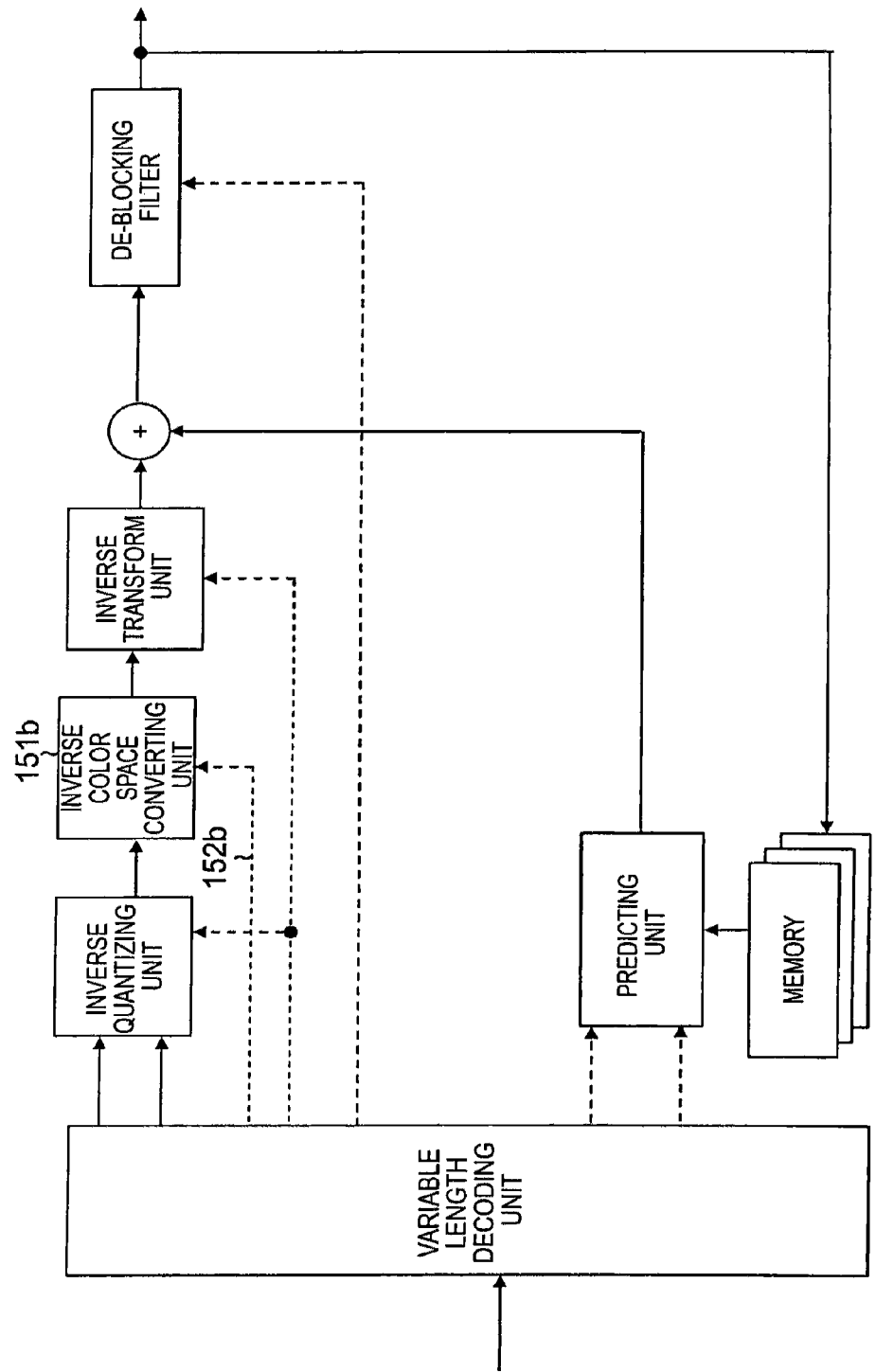
FIG. 21 is a block diagram showing a decoder corresponding to the encoder shown in FIG. 19.

Decoders corresponding to the encoders of FIGS. 18 and 19 are shown in FIGS. 20 and 21. Components shown in FIGS. 20 and 21 are the same as those shown in FIG. 16 except for an inverse color space transform unit. FIG. 20 illustrates a decoder that decodes a bit stream encoded by the encoder shown in FIG. 18 by performing the color space transform before the transform processing.

The variable length decoding unit decodes, from the bit stream, information on presence or absence of transform for selecting whether transform is performed in the inverse color space transform unit 151a and information 152a for selecting a conversion method executable in the inverse color space transform unit and supplies the information to the inverse color space transform unit 151a. The decoder shown in FIG. 20 carries out, in the inverse color space transform unit 151a, the color space transform processing for a prediction error signal after inverse transform on the basis of those kinds of information.

FIG. 21 illustrates a decoder that decodes a bit stream encoded by the encoder shown in FIG. 19 by selecting a frequency component to be subjected to processing after the transform processing and performing the color space transform. The variable length decoding unit decodes, from the bit stream, the identification information 152b including information on presence or absence of transform for selecting whether transform is performed in the inverse color space transform unit 151b, information for selecting a conversion method executed in the inverse color space transform unit information for specifying a frequency component in which the color space transform is carried out, and the like and supplies the information to the inverse color space transform unit 151b. The decoder shown in FIG. 21 carries out, in the inverse color space transform unit 151b, the color space transform processing for transform coefficient data after inverse quantization on the basis of these kinds of information.

In the decoders shown in FIGS. 20 and 21, as in the decoder in FIG. 15, if the first picture decoding unit 302 includes a function for decoding a bit stream conforming to the AVC high profile in which the three components are collectively encoded with the conventional YUV 4:2:0 format as an object, and the upper header analyzing unit 300 judges by which format a bit stream is encoded with reference to a profiler identifier decoded from the bit stream 106 and communicates a result of the judgment to the switch 10 and the first picture decoding unit 302 as a part of information of a signal line of the common encoding/independent encoding identification signal 101, it is also possible to constitute a decoder that secures compatibility of the conventional YUV 4:2:0 format with the bit stream.

Figure 22:
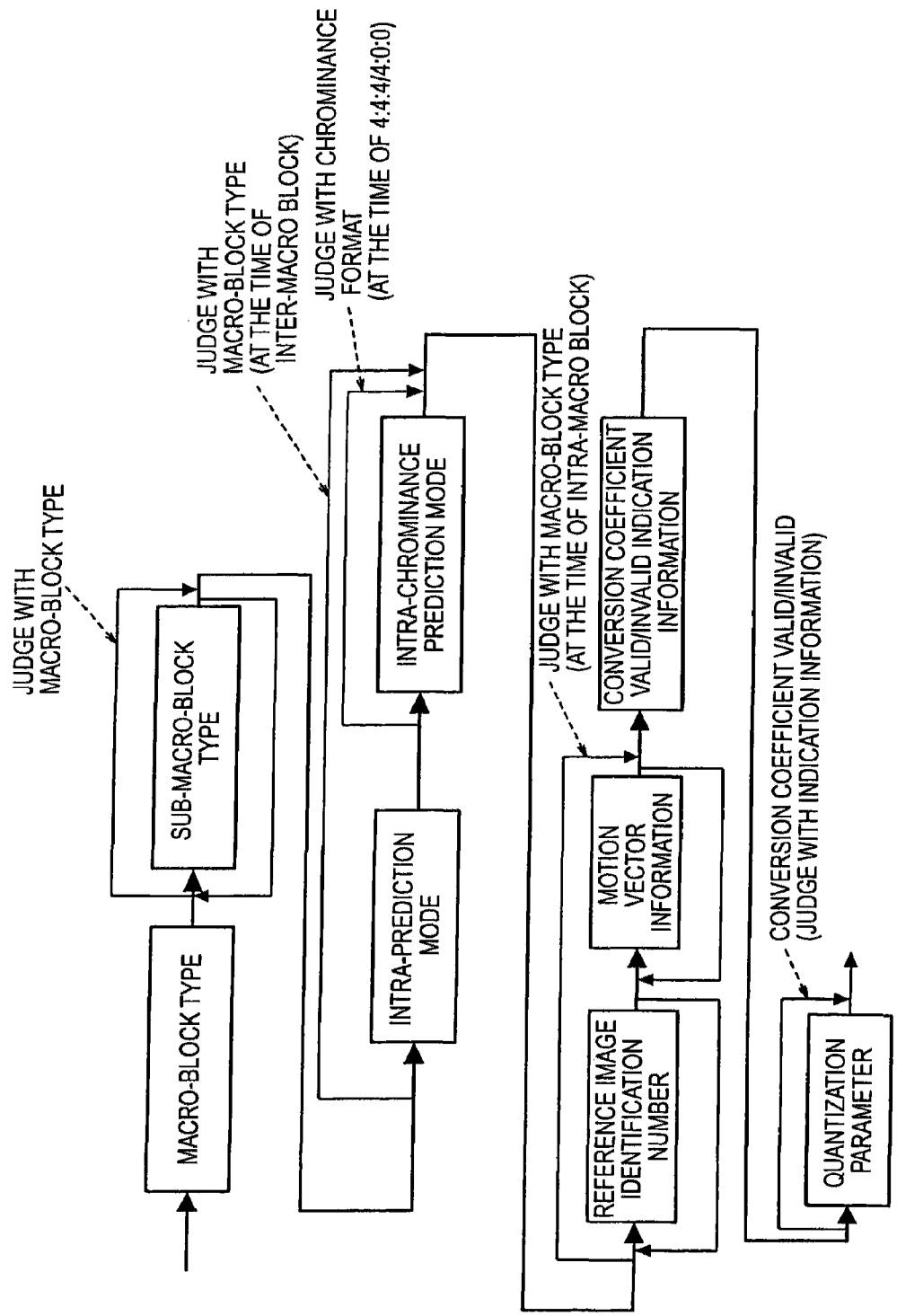
FIG. 22 is a diagram showing a structure of encoded data of macro-block header information included in a bit stream of a conventional YUV 4:2:0 format.

A structure of encoded data of macro-block header information included in a bit stream of the conventional YUV 4:2:0 format is shown in FIG. 22. When the macro-block type is the intra-prediction, encoded data of an intra-chrominance prediction mode 500 is included. When the macro-block type is the inter-prediction, a motion vector of a chrominance component is generated with a method different from that for a luminance component using a reference image identification number and motion vector information included in macro-block header information.

Operations of the decoder for securing compatibility of the conventional YUV 4:2:0 format with a bit stream will be explained. As described above, the first picture decoding unit 302 has a function for decoding a bit stream of the conventional YUV 4:2:0 format. An internal structure of the first picture decoding unit is the same as that shown in FIG. 16.

Operations of the first picture decoding unit 302 and the variable length decoding unit 310 having the function for decoding a bit stream of the conventional YUV 4:2:0 format will be explained. When the video stream 106 is inputted to the variable length decoding unit 310, the variable length decoding unit 310 decodes a chrominance format indication flag. The chrominance format indication flag is a flag included in a sequence parameter header of the video stream 106 and indicates whether an input video format is 4:4:4, 4:2:2, 4:2:0, or 4:0:0.

The decoding processing for macro-block header information of the video stream 106 is switched according to a value of the chrominance format indication flag. When the macro-block type indicates the intra-prediction and the chrominance designation flag indicates 4:2:0 or 4:2:2, the intra-chrominance prediction mode is decoded from the bit stream. When the chrominance format indication flag indicates 4:4:4, decoding of the intra-chrominance prediction mode is skipped. When the chrominance format indication flag indicates 4:0:0, since an input video signal is a format (the 4:0:0 format) constituted by only a luminance signal, decoding of the intra-chrominance prediction mode is skipped.

Decoding processing for macro-block header information other than the intra-chrominance prediction mode is the same as that in the variable length decoding unit 310 of the first picture decoding unit 302 not including the function for decoding a bit stream of the conventional YUV 4:2:0 format.

Consequently, when the video stream 106 is inputted to the variable length decoding unit 310, the variable length decoding unit 310 extracts a chrominance format indication flag (not shown), a quantized transform coefficient for three components, and macro-block header information (a macro-block type/sub-macro-block type, prediction overhead information, a transform block size designation flag, and a quantization parameter). The chrominance indication format indication flag (not shown) and the prediction overhead information are inputted to the predicting unit 311 to obtain the prediction image 127 for the three components.

Figure 23:
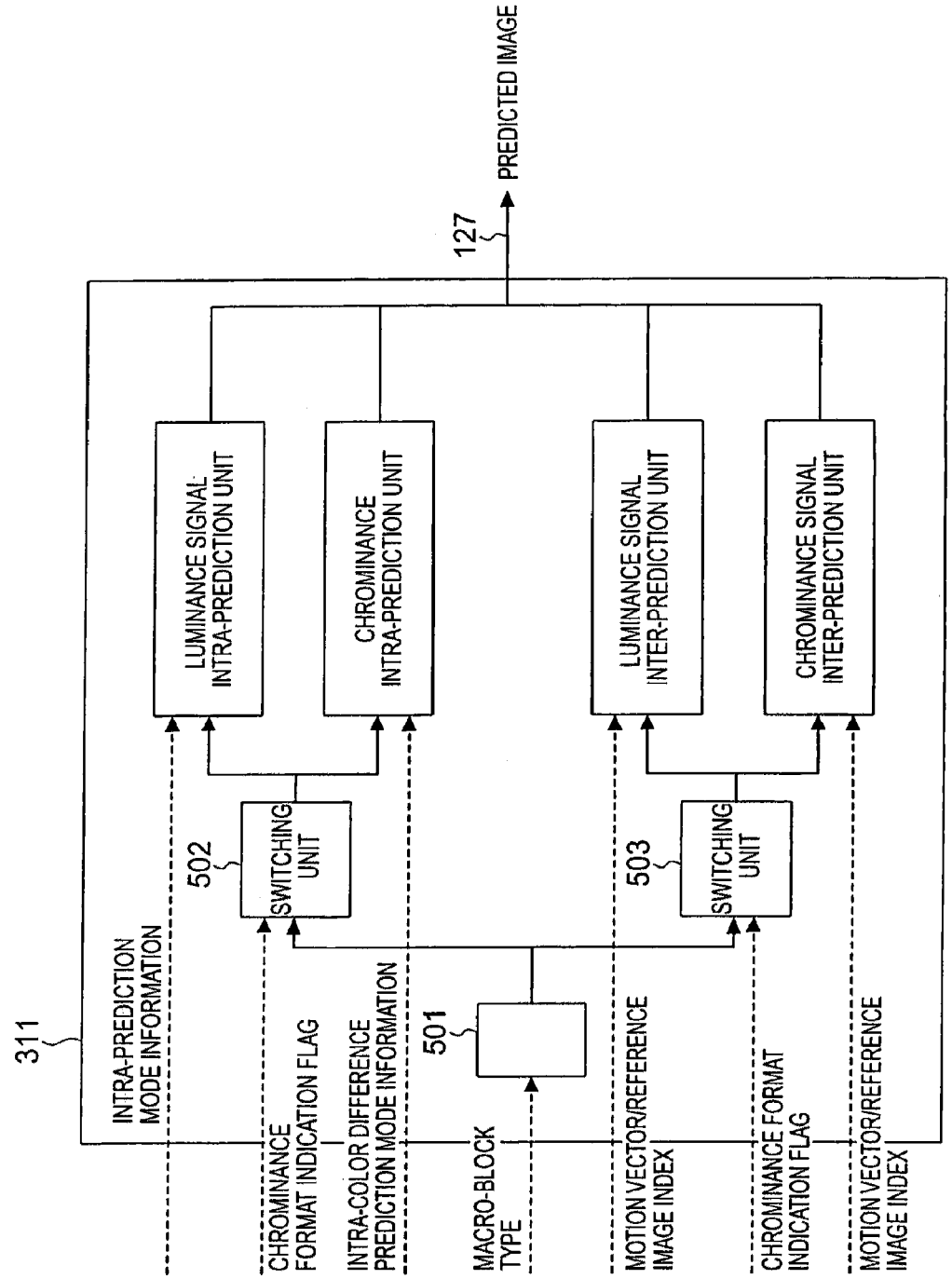
FIG. 23 is a diagram showing an internal structure of a predicting unit 311 of a first picture decoding unit 302 that secures compatibility of the conventional YUV 4:2:0 format with the bit stream.

An internal structure of the predicting unit 311 of the first picture decoding unit 302 that secures compatibility of the conventional YUV 4:2:0 format with a bit stream is shown in FIG. 23. Operations of the predicting unit 311 will be explained.

A switching unit 501 judges a macro-block type. When the macro-block type indicates the intra-prediction, a switching unit 502 judges a value of the chrominance format indication flag. When the value of the chrominance format indication flag indicates 4:2:0 or 4:2:2, the predicting unit 311 obtains the predicted image 127 for the three components from the prediction overhead information in accordance with the intra-prediction mode information and the intra-chrominance prediction mode information. A predicted image of a luminance signal among the three components is generated in a luminance signal intra-prediction unit in accordance with the intra-prediction mode information.

A predicted image of color differential signal of two components is generated in a color differential signal intra-prediction unit that performs processing different from that for the luminance component in accordance with the intra-chrominance prediction mode information. When the value of the chrominance format indication flag indicates 4:4:4, predicted images of all the three components are generated in the luminance signal intra-prediction unit in accordance with the intra-prediction mode information. When the value of the chrominance format indication flag indicates 4:0:0, since the 4:0:0 format is constituted by only the luminance signal (one component), only a predicted image of the luminance signal is generated in the luminance signal intra-prediction unit in accordance with the intra-prediction mode information.

When the macro-block type indicates the inter-prediction in the switching unit 501, the switching unit 503 judges a value of the chrominance format indication flag. When the value of the chrominance format indication flag indicates 4:2:0 or 4:2:2, concerning the luminance signal, a predicted image is generated from the prediction overhead information in the luminance signal inter-prediction unit in accordance with a motion vector and a reference image index and in accordance with a predicted image generating method for a luminance signal set by the AVC standard.

Concerning a predicted image of the color differential signal of two components, in the color differential signal inter-prediction unit, a motion vector obtained from the prediction overhead information is subjected to scaling on the basis of a chrominance format to generate a chrominance motion vector. A predicted image is generated from a reference image designated by a reference image index, which is obtained from the prediction overhead information, on the basis of the chrominance motion vector in accordance with a method set by the AVC standard. When the value of the chrominance format indication flag indicates 4:0:0, since the 4:0:0 format is constituted by only the luminance signal (one component), a predicted image of the luminance signal is generated in the luminance signal inter-prediction unit in accordance with the motion vector and the reference image index.

As described above, the means for generating a predicted image of a color differential signal of the conventional YUV 4:2:0 format is provided and the means for generation of predicted images of the three components is switched according to a value of the chrominance format indication flag decoded from the bit stream. Thus, it is possible to constitute a decoder that secures compatibility of the conventional YUV 4:2:0 format with the bit stream.

If information indicating a bit stream that can be decoded even in a decoder not supporting the color space transform processing such as the decoder shown in FIG. 15 is given to the bit stream 106 supplied to the decoders shown in FIGS. 20 and 21 in a unit of a sequence parameter or the like, in all the decoders in FIGS. 20, 21, and 15, it is possible to perform decoding of a bit stream corresponding to decoding performance of each of the decoders.

Eighth Embodiment

In an eighth embodiment of the present invention, another embodiment in which only a structure of a bit stream to be inputted and outputted is different in the encoder and the decoder according to the seventh embodiment shown in FIGS. 11, 15, and the like will be described. An encoder according to the eighth embodiment performs multiplexing of encoded data with a bit stream structure shown in FIG. 24.

In the bit stream of the structure shown in FIG. 9, the AUD NAL unit includes information primary_pic_type as an element thereof. As shown in a table below, this indicates information of a picture encoding type at the time when picture data in an access unit starting from the AUD NAL unit is encoded.

TABLE 1

Meaning of primary_pic_type (Excerpted from the standard)

| primary_pic_type | slice_type values that may be present in the primary coded picture |
|---|---|
| 0 | I |
| 1 | I, P |

TABLE 1-continued

Meaning of primary_pic_type (Excerpted from the standard)

| primary_pic_type | slice_type values that may be present in the primary coded picture |
|---|---|
| 2 | I, P, B |
| 3 | SI |
| 4 | SI, SP |
| 5 | I, SI |
| 6 | I, SI, P, SP |
| 7 | I, SI, P, SP, B |

For example, when primary_pic_type=0, this indicates that a picture is entirely intra-encoded. When primary_pic_type=1, this indicates that a slice to be intra-encoded and a slice for which motion compensation prediction can be performed using only one reference picture list can be mixed in a picture. Since primary_pic_type is information defining an encoding mode with which one picture can be encoded, on the encoder side, it is possible to perform encoding suitable for various conditions such as a characteristic of an input video signal and a random access function by operating this information.

In the seventh embodiment, since there is only one primary_pic_type for one unit, when the independent encoding processing is performed, primary_pic_type is common to three color component pictures in the access unit. In the eighth embodiment, when independent encoding of each of the color component pictures is performed, primary_pic_type for the remaining two color component pictures is additionally inserted in the AUD NAL unit shown in FIG. 9 according to a value of num_pitures_in_au. Alternatively, as in the bit stream structure shown in FIG. 24, encoded data of each of the color component pictures is started from an NAL unit (Color Channel Delimiter) indicating the start of the color component picture and, in this CCD NAL unit, primary_pic_type information corresponding thereto is included. A concept of the CCD NAL unit according to the eighth embodiment is equivalent to the concept disclosed in FIG. 4.

In this structure, since encoded data of the respective color component pictures for one picture is collectively multiplexed, the color component identification flag (color_channel_idc) described in the seventh embodiment is included in the CCD NAL unit rather than in a slice header. Consequently, it is possible to consolidate information of the color component identification flag required to be multiplexed with the respective slices into data in picture units. Thus, there is an effect that it is possible to reduce overhead information.

Since the CCD NAL unit constituted as a byte string only has to be detected to verify color_channel_idc only once per one color component picture, it is possible to quickly find the top of the color component picture without performing the variable length decoding processing. Thus, on the decoder side, color_channel_idc in a slice header does not have to be verified every time in order to separate an NAL unit to be decoded for each color component. It is possible to smoothly perform data supply to the second picture decoding unit.

On the other hand, with such a structure, the effect of reducing a buffer size and a processing delay of the encoder described with reference to FIG. 12 in the seventh embodiment is weakened. Thus, the color component identification flag may be constituted to indicate in a higher level (sequence or GOP) whether encoded data is multiplexed in slice units or multiplexed in color component picture units. By adopting such a bit stream structure, it is possible to perform flexible implementation of the encoder according to a form of use of the encoder.

Ninth Embodiment

Figure 24:
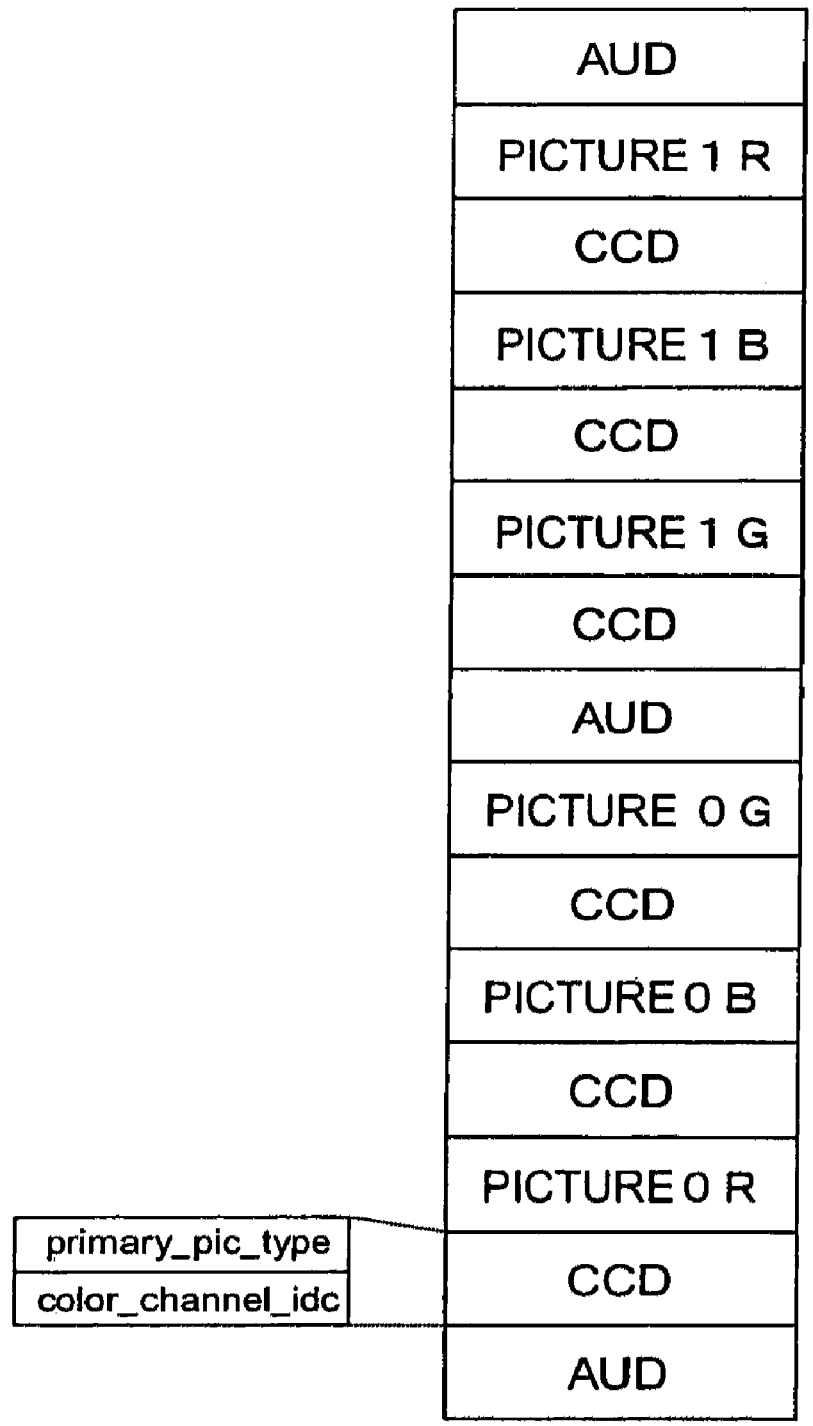
FIG. 24 is a diagram showing another example of a structure of a bit stream.
Figure 25:
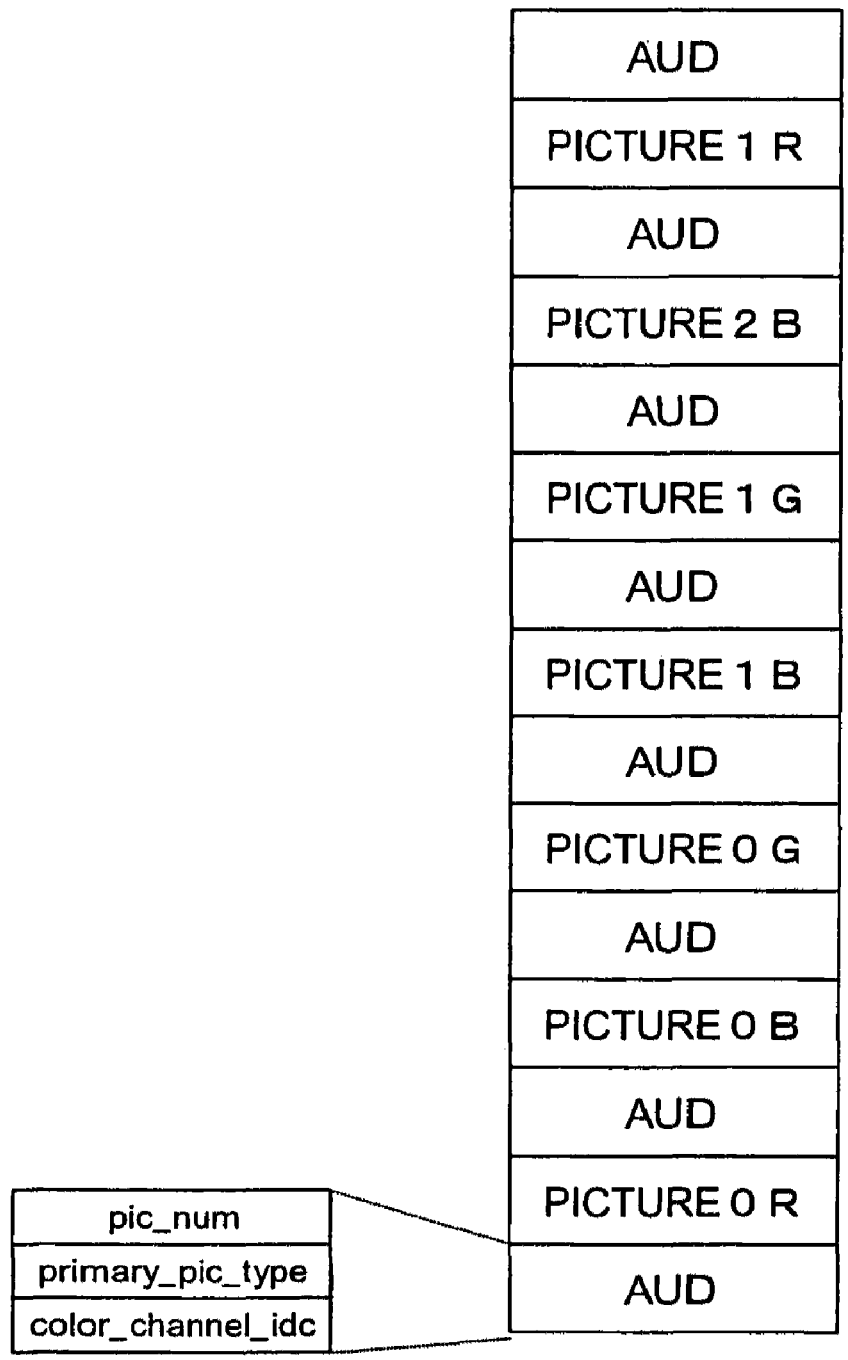
FIG. 25 is a diagram showing still another example of the structure of the bit stream.

Moreover, as still another embodiment, multiplexing of encoded data may be performed with a bit stream structure shown in FIG. 25. In the figure, color_channel_idc and primary_pic_type included in the CCD NAL unit shown in FIG. 24 are included in the respective AUDs. In the bit stream structure according to a ninth embodiment of the present invention, in the case of the independent encoding processing, as in the common encoding processing, one (color component) picture is included in one access unit. In other words, in FIG. 25, one picture (one color component) is defined as one access unit.

With such the structure, as in the structures described above, there is the effect of reduction of overhead information because it is possible to consolidate information of the color component identification flag into data in picture units. In addition, since the AUD NAL unit constituted as a byte string only has to be detected to verify color_channel_idc only once per one color component picture, it is possible to quickly find the top of the color component picture without performing the variable length decoding processing. Thus, on the decoder side, color_channel_idc in a slice header does not have to be verified every time in order to separate an NAL unit to be decoded for each color component. It is possible to smoothly perform data supply to the second picture decoding unit.

On the other hand, since an image of one frame or one field is constituted by three access units, it is necessary to designate the three access units as image data at identical time. Therefore, in the bit stream structure shown in FIG. 25, sequence numbers (encoding and decoding orders in a time direction, etc.) of respective pictures may be given to the AUDs.

With such the structure, on the decoder side, it is possible to verify decoding and display orders of the respective pictures, color component attributes, propriety of an IDR, and the like without decoding slice data at all. It is possible to efficiently perform editing and special reproduction on a bit stream level.

In the bit stream structure shown in FIG. 9, 24, or 25, information designating the number of slice NAL units included in one color component picture may be stored in the regions of the AUDs or the CCDs.

Concerning all the embodiments, the transform processing and the inverse transform processing may be transform for guaranteeing orthogonality such as the DCT or may be transform such as the AVC combined with the quantization and inverse quantization processings to approximate orthogonality rather than the strict orthogonal transform such as the DCT. Further, a prediction error signal may be encoded as information on a pixel level without performing transform.

The invention claimed is:

1. An image decoder for decoding a color image signal based on an input of a bit stream generated by compression-encoding a color image in a 4:4:4 format, comprising:
an identification information decoding unit that decodes identification information included in the bit stream, the identification information indicating whether or not signals of respective color components are independently encoded in a 4:0:0 format; and
a color component information decoding unit that, in a case where the identification information indicates that the signals of respective color components are independently encoded in a 4:0:0 format, decodes color component identification information included in a slice header, the color component identification information identifying to which of the color components the encoded data included in the slice corresponds.

2. An image decoding method for performing decoding processing based on an input of a bit stream generated by compressing an image signal including a plurality of color components, comprising:

decoding, using an upper header analyzing unit, a parameter from header information of a NAL unit in a syntax of the bit stream; and decoding, using at least one picture decoding unit, encoded data of each of the color components using a parameter indicating which color component the encoded data corresponds to, wherein the parameter indicating which color component the encoded data corresponds to is detected from a part of header information of an NAL unit in a syntax of the bit stream.

3. An image decoding method for performing decoding processing based on an input of a bit stream generated by compressing an image signal including a plurality of color components, comprising:

decoding, using at least one picture decoding unit, encoded data of each of the color components using a parameter indicating which color component the encoded data corresponds to, wherein a spatial structure of a slice of the encoded data is common to all the color components.

4. An image decoding method for decoding a color image signal based on an input of a bit stream generated by compression-encoding a color image in a 4:4:4 format, comprising:

decoding, using an identification information decoding unit, identification information included in the bit stream, the identification information indicating whether or not signal of respective color components are independently encoded in a 4:0:0 format; and if the identification information indicates that the signals of respective color components are independently encoded in a 4:0:0 format, decoding, using a color component information decoding unit, color component identification information including an a slice header, the color component identification information identifying which of the color components correspond to the encoded data included in the slice.

* * * * *